US012101855B2

(12) United States Patent
Puvanakijjakorn

(10) Patent No.: US 12,101,855 B2
(45) Date of Patent: Sep. 24, 2024

(54) POWER SUPPLY

(71) Applicant: Wangs Alliance Corporation, Port Washington, NY (US)

(72) Inventor: Voravit Puvanakijjakorn, Port Washington, NY (US)

(73) Assignee: Wangs Alliance Corporation, Port Washington, NY (US)

( * ) Notice: Subject to any disclaimer, the term of this patent is extended or adjusted under 35 U.S.C. 154(b) by 0 days.

(21) Appl. No.: 18/518,691

(22) Filed: Nov. 24, 2023

(65) Prior Publication Data

US 2024/0260150 A1 Aug. 1, 2024

Related U.S. Application Data

(60) Provisional application No. 63/441,234, filed on Jan. 26, 2023.

(51) Int. Cl.

| | |
|---|---|
| ***H05B 45/14*** | (2020.01) |
| ***H05B 47/155*** | (2020.01) |
| ***H05B 47/23*** | (2020.01) |
| ***H05B 47/25*** | (2020.01) |

(52) U.S. Cl.

CPC ........... *H05B 45/14* (2020.01); *H05B 47/155* (2020.01); *H05B 47/23* (2020.01); *H05B 47/25* (2020.01)

(58) Field of Classification Search

CPC ........ H05B 45/14; H05B 47/23; H05B 47/25; H05B 47/155

See application file for complete search history.

(56) References Cited

U.S. PATENT DOCUMENTS

| | | | |
|---|---|---|---|
| 8,299,987 | B2 | 10/2012 | Neudorf et al. |
| 8,525,446 | B2 | 9/2013 | Tikkanen et al. |
| 8,926,133 | B2 | 1/2015 | Booth |
| 8,957,601 | B2 | 2/2015 | Tikkanen et al. |
| 9,041,379 | B2 | 5/2015 | Lyons |
| 9,433,053 | B2 | 8/2016 | Neudorf |
| 9,591,713 | B2 | 3/2017 | Tikkanen et al. |
| 9,942,954 | B2 | 4/2018 | Neudorf et al. |

(Continued)

FOREIGN PATENT DOCUMENTS

| | | | |
|---|---|---|---|
| CA | 2564659 | 8/2013 | |
| CA | 3023969 | 11/2017 | |
| WO | WO-2016022612 A1 * | 2/2016 | ............ A61M 21/02 |

*Primary Examiner* — Alexander H Taningco
*Assistant Examiner* — Pedro C Fernandez
(74) *Attorney, Agent, or Firm* — Weiss & Arons LLP

(57) ABSTRACT

Apparatus, methods and systems for providing power to light-emitting diode ("LED") light sources are provided. The apparatus may include a plurality of power output channels. Each of the power output channels may provide a current to a plurality of LED modules. Each of the LED modules may correspond to one of the power output channels. The apparatus may include a protection circuit. The protection circuit may receive a conditioned voltage. The protection circuit may use the conditioned voltage to feed to the power output channels an output current that, in total, has a power no greater than a predetermined power limit. The apparatus may include a voltage conditioning circuit. The voltage condition circuit may receive line voltage. the voltage condition circuit may condition the line voltage. The voltage conditioning circuit may provide the conditioned voltage to the protection circuit.

30 Claims, 27 Drawing Sheets

(56) References Cited

U.S. PATENT DOCUMENTS

| | | | | |
|---|---|---|---|---|
| 10,076,016 | B2 | 9/2018 | Tikkanen et al. | |
| 2007/0103086 | A1* | 5/2007 | Neudorf | H05B 45/375 362/233 |
| 2012/0313528 | A1* | 12/2012 | Chen | H05B 47/23 315/121 |
| 2015/0115839 | A1* | 4/2015 | Tikkanen | H05B 45/37 315/294 |
| 2017/0280523 | A1* | 9/2017 | Kathiresan | H05B 47/10 |
| 2021/0120643 | A1* | 4/2021 | Ye | H05B 45/46 |
| 2022/0053617 | A1* | 2/2022 | Zhang | H05B 45/345 |
| 2023/0345596 | A1* | 10/2023 | Slivka | H05B 47/19 |

* cited by examiner

485

POWER SUPPLY

CROSS-REFERENCE TO RELATED APPLICATIONS

This is a non-provisional of U.S. Provisional Application No. 63/441,234, filed on Jan. 26, 2023, which is hereby incorporated by reference in its entirety.

BACKGROUND

Overcurrent protection circuits are typically provided for fixtures that may be vulnerable to conditions such as overload, short-circuit or ground-fault. Controllable light emitting diode ("LED") lighting can be designed with branches of circuits that are controlled by a common controller circuit. The branches may be connected to, or disconnected from, the circuit by a user. The branches may be selectable by the user, such that the controller circuit may interface with different loads for different branches. Individual over-current protection is typically provided for each branch. The maximum allowable current for each individual branch, n, of the N branches may be the maximum allowable current through the controller circuit divided by N—an average maximum in current.

It may be desirable, therefore, to provide overcurrent protection that is common to all the branches. It may also be desirable to provide overcurrent protection, that a single branch is not limited to an average maximum current.

Figure 1:
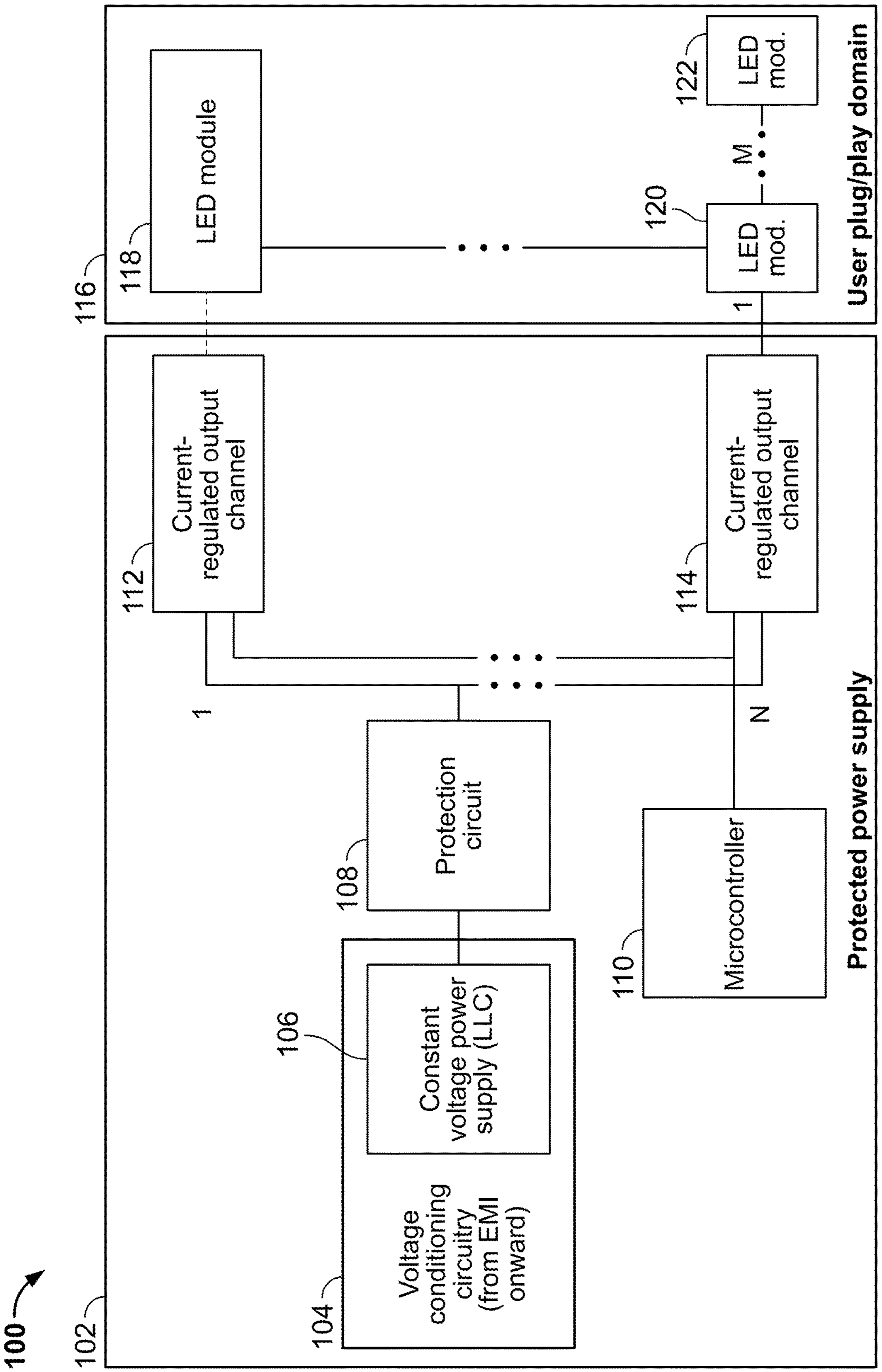
FIG. 1 shows illustrative apparatus in accordance with principles of the invention.

The leftmost digit (e.g., "L") of a three-digit reference numeral (e.g., "LRR"), and the two leftmost digits (e.g., "LL") of a four-digit reference numeral (e.g., "LLRR"), generally identify the first figure in which a part is called-out.

DETAILED DESCRIPTION

Apparatus and methods for providing power to light emitting diode ("LED") light sources are provided. The apparatus may include a power supply. The power supply may provide power for generating light from LEDs. The power supply may be an enclosed-electronics power supply. The power supply may include an integrated wiring compartment for streamlined installation.

The power supply may include a plurality of power output channels. Each of the output power channels may include circuitry. Each of the output channels may represent a branch of the power supply. The plurality of output power channels may be controlled by a single controller.

The power supply may include a plurality of LED modules. Each LED module may include a plurality of LED light sources. Each LED module may correspond to one of the power output channels. Each power output channel may provide a current to a corresponding LED module. The current may be a regulated current.

The power output channels may include output terminals. The power supply may include six output terminals. The terminals may include quick connectors for conductors from 24-12 AWG or any other suitable size. The quick connectors may include solid, stranded, fine-stranded material. The quick connectors may include any other suitable material conductors.

The connectors may include a lever. A user may pull the lever up, insert a conductor and push the lever back down to make electrical contact between the terminal and the conductor.

The power supply may include over-voltage protection. The power supply may include short circuit protection. The power supply may include over-current protection. The power supply may include an overcurrent protection circuit. The overcurrent protection circuitry may protect the power supply from overcurrent, over-voltage, and short circuit conditions.

The power supply may include a voltage conditioning circuit. The voltage conditioning circuit may receive an input voltage. The voltage conditioning circuit may receive an input voltage of 120-277 VAC. The input voltage may be a line voltage. The voltage conditioning circuit may receive the line voltage from a power source. The voltage conditioning circuit may condition the line voltage.

An LED module may have an operating voltage. The voltage conditioning circuit may generate a boosted voltage from the line voltage. The boosted voltage may be greater than the line voltage. The line voltage may be boosted using boost circuitry. The boost circuitry may be included in the voltage conditioning circuit. The line voltage may be boosted to stabilize the current. The boosted voltage may be transmitted through inductor-inductor-capacitor ("LLC")

circuitry. The LLC circuitry may also be included in the voltage conditioning circuit. The LLC circuitry may include a transformer. The transformer may reduce the boosted voltage. The voltage conditioning circuit may provide to the power output channels a conditioned voltage. The conditioned voltage may be greater than the operating voltage The conditioned voltage may be transmitted to the overcurrent protection circuit.

The overcurrent protection circuit may receive the conditioned voltage. The conditioned voltage may be a DC voltage. The conditioned voltage may be a constant voltage. The conditioned voltage may be a constant DC voltage. The conditioned voltage may be any suitable conditioned voltage. The overcurrent protection circuit may use the conditioned voltage. The overcurrent protection circuit may limit the conditioned voltage. The overcurrent protection circuit may use the conditioned voltage to feed to each of the power output channels output current.

A power output channel may provide regulated current to an LED module at the operating voltage. The operating voltage may be lower than the voltage received by the overcurrent protection circuit. The power output channels may include step-down circuitry. The step-down circuitry may include a buck converter. The step-down circuitry may further reduce the conditioned voltage. The step-down circuitry may reduce the conditioned voltage using a transformer. The step-down circuitry may reduce the conditioned voltage using any suitable voltage step-down circuitry components. The stepped-down voltage may be used to provide the regulated current to the LED modules.

In total, the output current of each of the power output channels may have a power that is no greater than a predetermined power limit. The predetermined power limit may correspond to an Underwriters Laboratories ("UL") Class 2 classification. A UL Class 2 classification may ensure that the output current is considered safe to touch and does not require primary safety protection at the LED level. The power supply may be a Class 2 UL listed power supply. The power supply may be a cUL listed power supply.

The predetermined power limit may be factory set. The predetermined power limit may be non-user selectable. The predetermined limit may be nominally 96 W. The predetermined limit may be any other suitable value.

Table lists illustrative ranges of maximum total power output.

TABLE 1

| Illustrative ranges of maximum total power output.<br>Illustrative total power output |
|---|
| <90 W |
| 91-95 W |
| 96-100 W |

Other suitable ranges of maximum total power output

The plurality of LED modules may include a number of operational LED modules. The number may be user selectable. The number may be limited by the predetermined power limit. A single LED module may be connected to a single power output channel. A series of LED modules may be connected to a single power output channel. The series of LED modules may include a user selectable number of LED modules. The series of LED modules may be limited by the predetermined power limit. The plurality of power output channels may have a total maximum allowable power output. Based on the total maximum allowable power output, the power limit for each power output channel may be different. The power limit for each power output channel may depend on an amount of LED modules that are connected to each power output channel. The maximum allowable power for each of power output channel may be the maximum allowable power of the power output channels divided by the number of connected LED modules.

The plurality of LED modules may include a first LED module. The plurality of LED modules may include a second LED module. The first LED module and the second LED module may receive power from the same power output channel. The first LED module and the second LED module may be connected in series with each other. The first LED module and the second LED module may be connected electrically in parallel with each other.

The overcurrent protection circuit may prevent user exposure, from the LED modules in aggregate, to power greater than the predetermined limit. The protection may occur independent of the number of LED modules connected to the power output channels.

The power supply may provide a dimming function to adjust the brightness of the LEDs. The power supply may be compatible with one or more of a TRIAC dimmer, an ELV dimmer, a 0-10V dimmer, and any other suitable dimmer.

Each of the LED modules may have a brightness. The brightness for each LED module may be controlled by a user. The apparatus may include a microcontroller. The microcontroller may include a dimming mode setting. The microcontroller may adjust the brightness of each of the modules. The microcontroller may adjust the brightness of each of the LED modules based on a dimming signal. The dimming signal may correspond to the dimming mode setting. The diming mode setting may be user selectable.

Table 2 lists illustrative dimming signals.

TABLE 2

| Illustrative dimming signals.<br>Illustrative dimming signals |
|---|
| Electric Low Voltage ("ELV") |
| Triode for Alternating Current ("TRIAC") |
| 0-10 Volt |
| Digital Multiplexing (DMX) |
| Other suitable dimming signals |

The microcontroller may adjust individually the brightnesses of the connected LED modules. The microcontroller may adjust together the brightnesses of the connected LED modules. The microcontroller may adjust the brightnesses based on the user selected dimming signal.

A power output channel may be controlled individually. The power output channel may be controlled via a DMX controller or protocol. If multiple power output channels are controlled through 0-10V or TRIAC/ELV, all of the power output channels controlled through 0-10V or TRIAC/ELV may be controlled together.

If the unit has DMX function, it may have a switch that may allow a user to select between dimming modes. The modes may include TIRAC/ELV/0-10V or DMX function. The power supply may be a power supply that does not operate in both modes concurrently.

The power supply may include a user interface ("UI"). The UI may include a switch. The UI may include a rotary dial. The UI may include four switches. Three of the switches may be for setting a DMX address. One of the switches may be for setting a dimming curve. The UI may provide data feedback to the microcontroller.

Each of the plurality of LED modules may be operable at a brightness. The microcontroller may control the brightness. The microcontroller may include a dimming mode setting. The microcontroller may include a dimming curve setting. The power supply may provide a dimming curve. The dimming curve may be adjustable. The dimming curve may be user-adjustable. The microcontroller may be configured to adjust the brightness of each of the modules. The brightness may be adjusted based on a dimming signal corresponding to the dimming curve. The microcontroller may adjust a correlated color temperature ("CCT") of each of the modules. The CCT may be based on the dimming curve and the brightness.

The microcontroller may adjust the brightness and the CCT temperature of each LED module individually. The microcontroller may adjust the brightness and CCT temperature of the LED modules together.

The power output channels, the overcurrent protection circuit; and the voltage conditioning circuit may be included in a power-limited power supply. The limited power supply may include the microcontroller. The regulated current may be regulated based on a control signal received from the microcontroller.

Selected components of the apparatus are described below in reference to the figures.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Illustrative embodiments of apparatus and methods in accordance with the principles of the invention will now be described with reference to the accompanying drawings, which form a part hereof. It is to be understood that other embodiments may be utilized and that structural, functional and procedural modifications, additions or omissions may be made, and features of illustrative embodiments, whether apparatus or method, may be combined, without departing from the scope and spirit of the present invention.

FIG. 1 shows illustrative architecture of apparatus 100. Apparatus 100 may include protected power supply 102. Protected power supply 102 may include current regulated output channel 112. Protected power supply 102 may include current regulated output channel 114. Protected power supply 102 may include a number, N, of current regulated output channels.

Protected power supply 102 may include voltage conditioning circuitry 104. Voltage conditioning circuitry may include constant power supply 106. Voltage conditioning circuitry 104 may receive line voltage. Voltage conditioning circuitry 104 may convert received line voltage from AC to DC voltage. Voltage conditioning circuitry 104 may rectify the voltage. Voltage conditioning circuitry 104 may condition the voltage. Voltage conditioning circuitry 104 may boost the voltage. Voltage conditioning circuitry 104 may step down the voltage.

The stepped down voltage may be transmitted through protection circuitry 108. Protection circuitry 108 may ensure a constant current. Protection circuitry 108 may protect the power supply from overcurrent. Protection circuitry 108 may regulate the current being transmitted to current regulated output channels 112 through 114. Current regulated output channel 112 may be a first current regulated output channel. Current regulated output channel 114 may be an $n^{th}$ current regulated output channel. There may be a plurality of current regulated output channels in between current regulated output channel 112 and current regulated output channel 114.

Protected power supply 102 may include microcontroller 110. Microcontroller 110 may transmit pulse width modulated ("PWM") signals to current regulated output channels 112 and 114. Microcontroller 110 may transmit PWM signals to the $n^{th}$ number of current regulated output channels. Microcontroller 110 may transmit a dimming signal to the LED modules connected to current regulated output channels 112 and 114. Microcontroller 110 may transmit a dimming signal to LED modules connected to the $n^{th}$ number of current regulated output channels.

The dimming signal may include a digital multiplexing ("DMX") dimming signal. The dimming signal may include a triode for alternating current ("TRIAC") dimming signal. The dimming signal may include 0-10V dimming signal. The dimming signal may include an electrical low voltage ("ELV") dimming signal. The dimming signal may include any suitable dimming signal.

Apparatus 100 may define user plug/play domain 116. User plug/play domain 116 may include LED module 118. LED module 118 may be connected to current regulated output channel 112. LED module 118 may be plugged into current regulated output channel 112. LED module 118 may receive power from current regulated output channel 112. User plug/play domain 116 may include LED module 120. User plug/play domain 116 may include LED module 122. LED module 120 may be connected in series with LED module 122. LED module 120 may be a first LED module. LED module 122 may be an $m^{th}$ LED module. There may be a plurality of LED modules connected in series with LED modules 120 and 122. LED modules 120, 122, and any other connected LED modules may receive power from current regulated output channel 114.

User plug/play domain may include a plurality of LED modules. The plurality of LED modules may be connected to the plurality of current regulated output channels. Protected power supply 102 may include a number of current regulated output channels. User plug/play domain may include a corresponding number of pluggable ports to the number of current regulated output channels.

Table 3 lists illustrative number of current regulated output channels.

TABLE 3

| Illustrative number of current regulated output channels. Illustrative number of current | |
|---|---|
| 1 | 7 |
| 2 | 8 |
| 3 | 9 |
| 4 | 10 |
| 5 | 11 |
| 6 | 12 |

Other suitable number of current regulated output channels

Each of the current regulated output channels may provide power to an LED module plugged into the corresponding port. When there is no LED module plugged into a current regulated output channel, the current regulated output channel may not provide power through the corresponding port. The current regulated output channels may have a maximum total power output.

Table 4 lists illustrative ranges of maximum total power output.

TABLE 4

| Illustrative ranges of maximum total power output. Illustrative total power output |
| --- |
| <90 W |
| 91-95 W |
| 96-100 W |

Other suitable ranges of maximum total power output

Each of the current regulated output channels may provide a different amount of power. Each of the current regulated output channels may provide a different amount of power depending on how many current regulated output channels are connected to LED modules. Each of the current regulated output channels may provide a different amount of power depending on how many LED modules are plugged into each corresponding port. Each of the current regulated output channels may provide a different amount of power depending on the maximum total power output.

Figure 2:
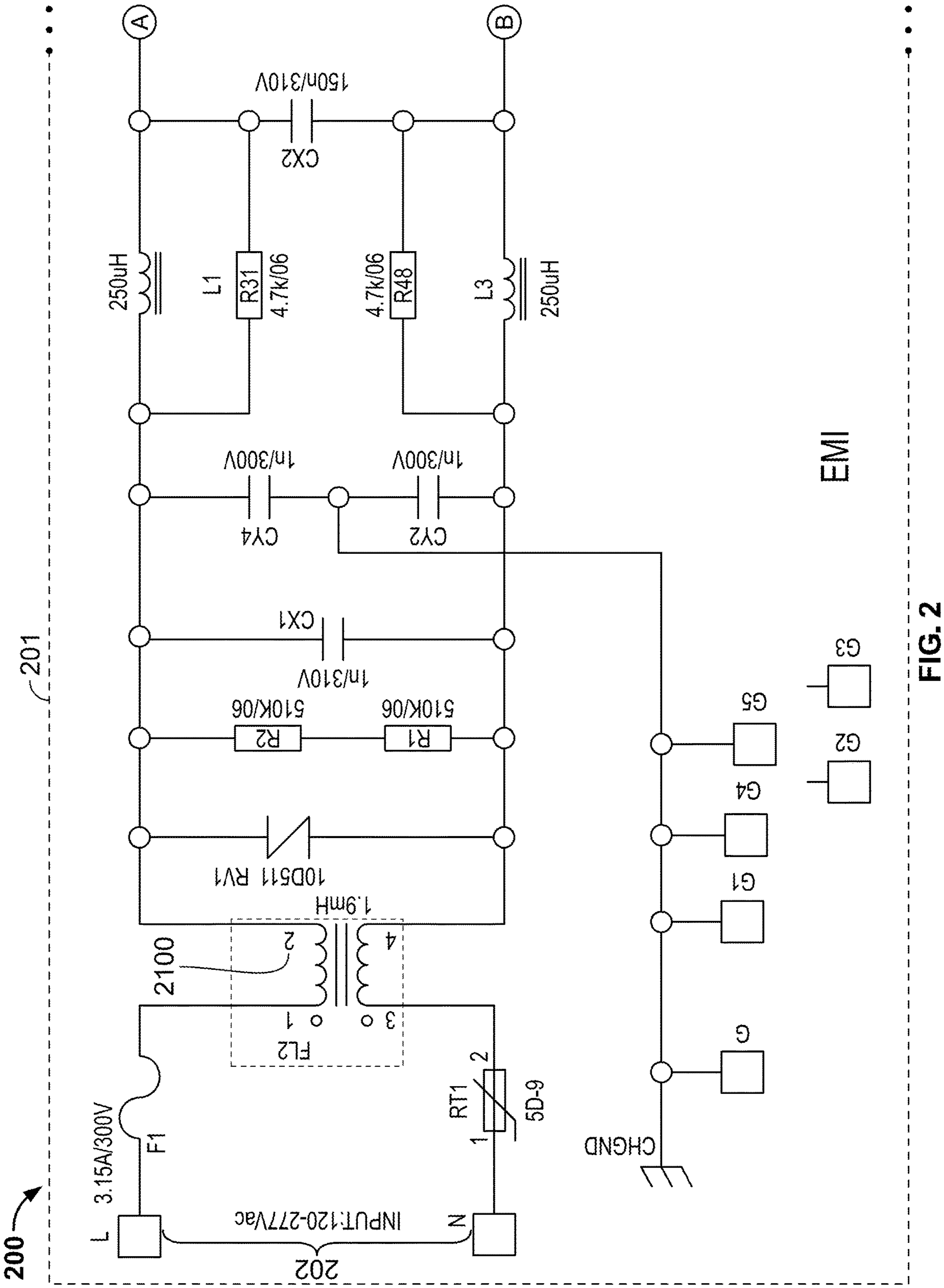
FIG. 2 shows illustrative apparatus in accordance with principles of the invention.
Figure 2:
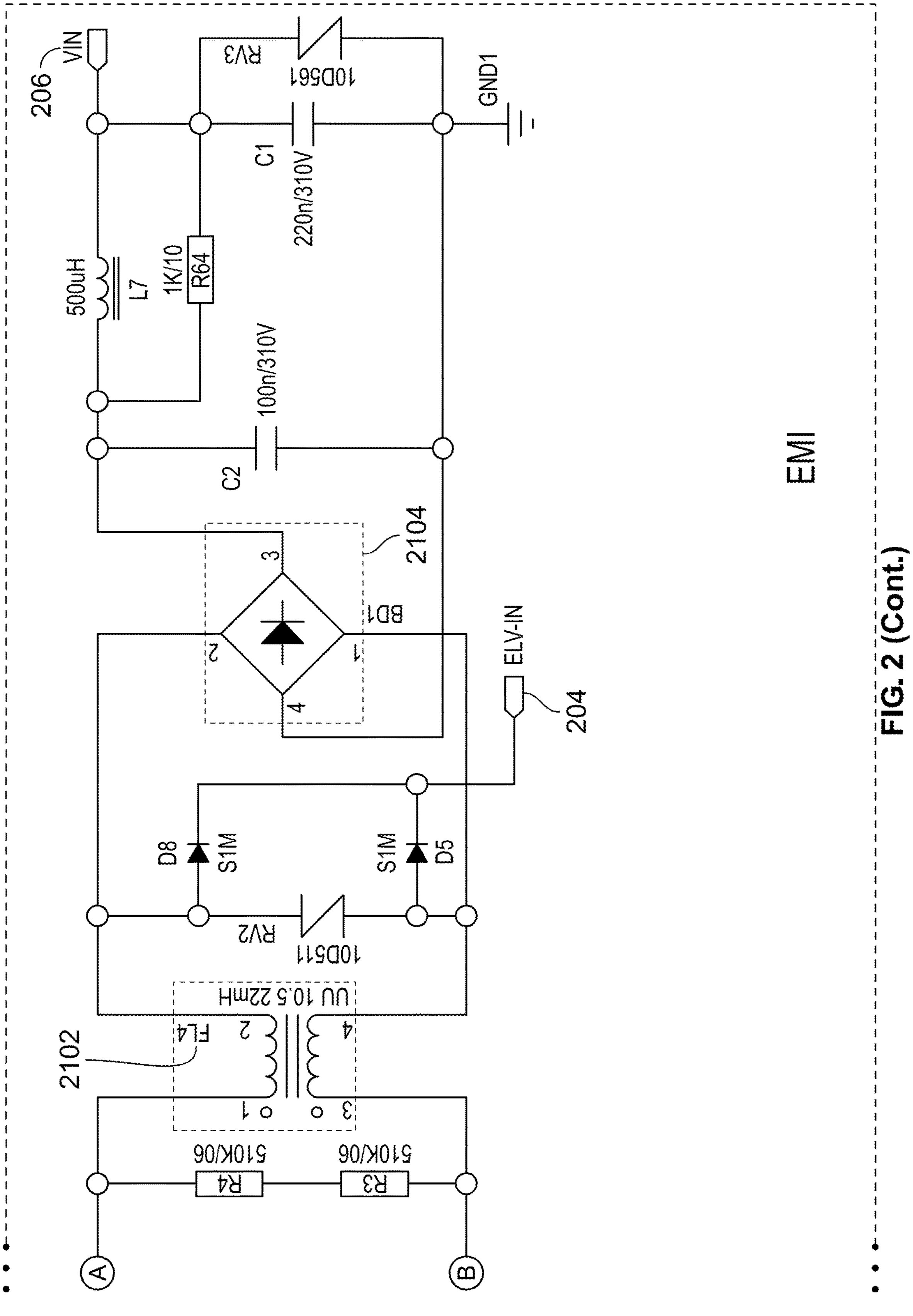

FIG. 2 shows illustrative circuit 200. Circuit 200 may have one or more features in common with one or more features of apparatus 100. Illustrative circuit 200 may include electromagnetic interference ("EMI") circuitry 201. EMI circuitry 201 may include input voltage terminals 202. Input voltage terminals 202 may receive line voltage. The line voltage may be 120-277 VAC. The line voltage may include noise. EMI circuitry 201 may include or common mode inductors 2100 (FL2) and 2102 (FL4). Common mode inductors 2100 and 2102 may be used to remove and/or suppress noise and other EMI from the line voltage.

EMI circuitry 201 may contain rectifier bridge 2104 (BD1). Rectifier bridge 2104 may rectify the AC line voltage. The rectified voltage may be smoothed into a DC waveform using a capacitor. EMI circuitry 201 may output a DC voltage. EMI circuitry 201 may output a DC voltage through terminal 206. EMI circuitry 201 may convert line voltage of 120-277 VAC to 120 VDC. EMI circuitry 201 may output 120 VDC through terminal 206.

EMI circuitry 201 may include ELV-IN terminal 204. ELV-IN terminal 204 may connect to TRIAC/ELV circuitry 233. ELV-IN terminal 204 may transmit an input voltage from EMI circuitry 201 to TRIAC/ELV circuitry 233. The input voltage may be transmitted before it is converted to a DC voltage. The input voltage transmitted may be AC voltage. The voltage may be transmitted to TRIAC/ELV circuitry 233 to provide a signal for phase angle dimming to microcontroller 227. The AC voltage may be used to determine a dimming level from a phase cut dimmer.

Figure 3:
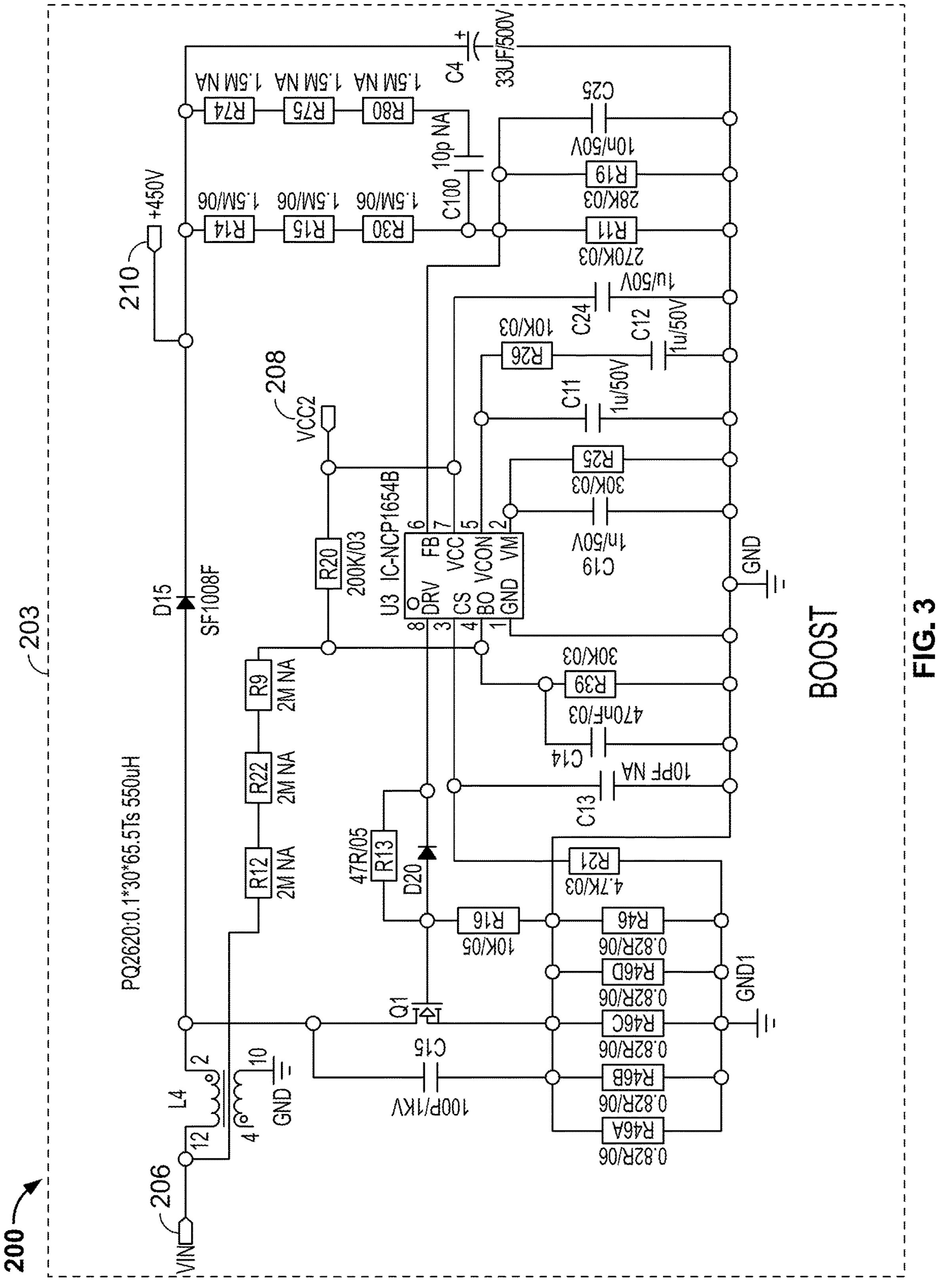
FIG. 3 shows illustrative apparatus in accordance with principles of the invention.

FIG. 3 shows illustrative circuit 200. Circuit 200 may include boost circuitry 203. Boost circuitry 203 may boost voltage received through terminal 206. Voltage received through terminal 206 may be 120 VDC. Boost circuitry 203 may boost the voltage from 120 VDC to 450 VDC. Boost circuitry 203 may transmit the boosted voltage through terminal 210.

Boost circuitry 203 may receive power from voltage common collector ("VCC") circuitry 207. Boost circuitry 203 may receive power from VCC circuitry 207 through terminal 208 (VCC2).

Figure 4:
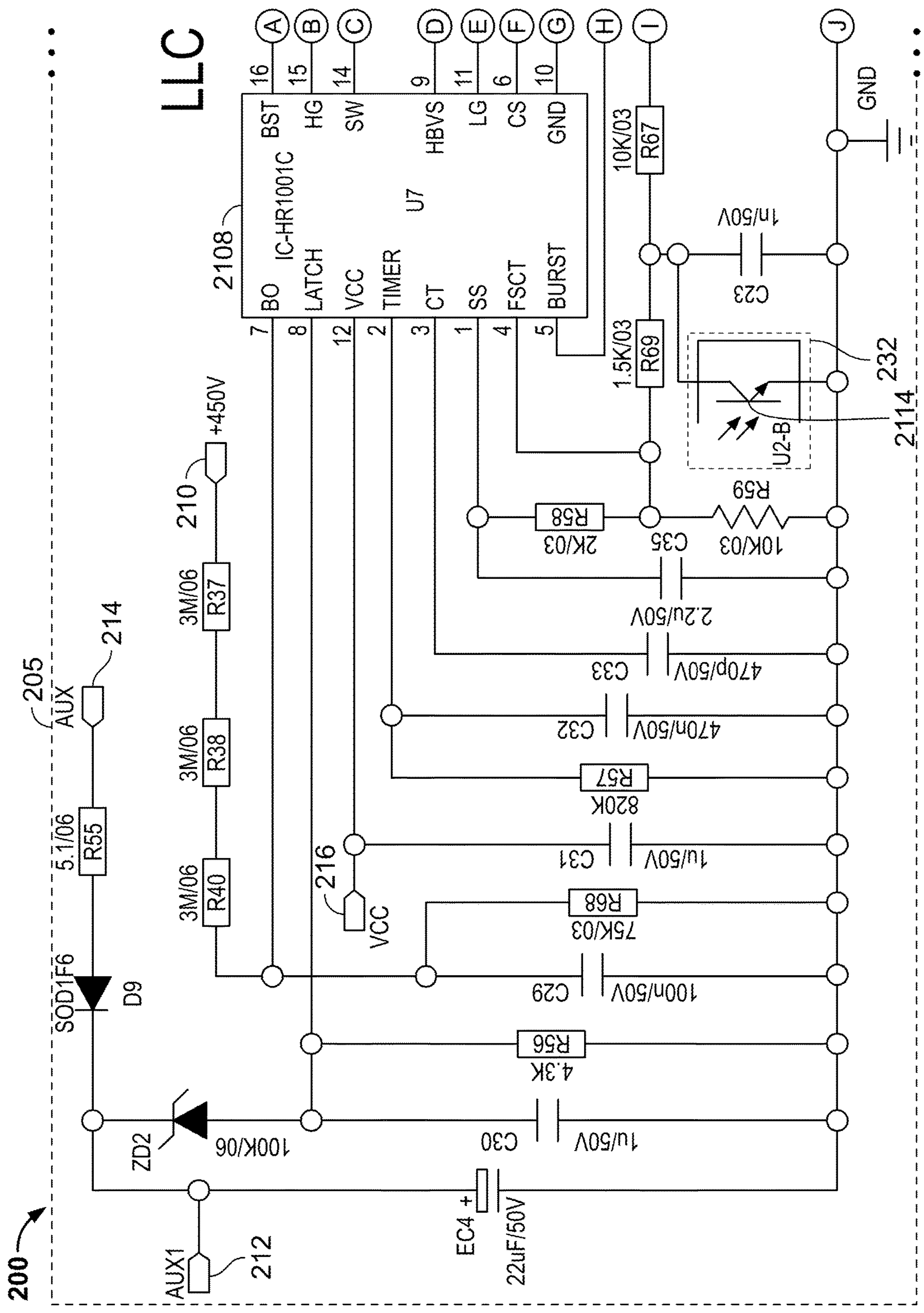
FIG. 4 shows illustrative apparatus in accordance with principles of the invention.
Figure 4:
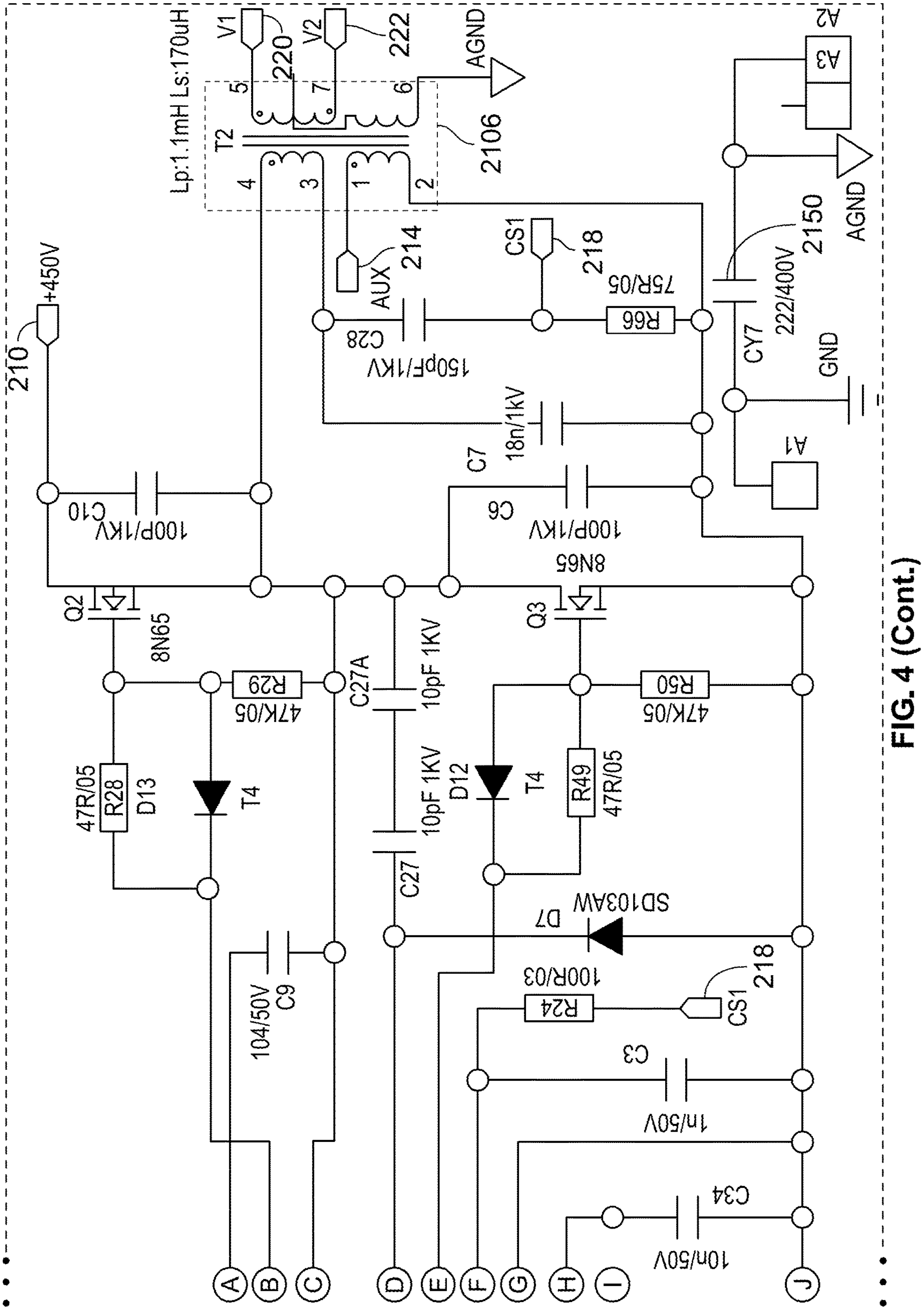

FIG. 4 shows illustrative circuit 200. Circuit 200 may include inductor-inductor capacitor ("LLC") circuitry 205. LLC circuitry 205 may be an LLC resonant converter. LLC circuitry 205 may be used for high-efficiency power conversion. LLC circuitry 205 may include LLC topology to transfer energy from a primary to a secondary side of circuit 200. LLC circuitry 205 may operate in a resonance mode. LLC circuitry 205 may use natural resonant frequency of circuit 200 to switch power between input and output stages. LLC circuitry 205 may tune values of inductors and capacitors included in LLC circuitry 205 to create a resonant tank circuit. A switching frequency of the converter may be synchronized with the resonant frequency of the resonant tank circuit.

LLC circuitry 205 may output voltage through terminals 220 (V1) and 222 (V2). The voltage may be transmitted from terminals 220 and 222 to a second side of circuit 200. The output voltage may be stepped down from 450 VDC received from boost circuitry 203.

LLC circuitry may include transformer 2106. Transformer 2106 may step down the 450 VDC received from boost circuitry 203 through terminal 210. Transformer 2106 may output a stepped-down voltage through terminals 220 and 222. The voltage transmitted from terminals 220 and 222 may be the same voltage. The voltage transmitted from terminal 220 may be different from the voltage transmitted from terminal 222. The voltage transmitted from terminals 220 and 222 may have the same polarity. The voltage transmitted from terminals 220 and 222 may have different polarities. The voltage transmitted from terminals 220 and 222 may have a power that does not exceed the predetermined limit.

LLC circuitry 205 may be connected to VCC circuitry 207. LLC circuitry 205 may be connected to VCC circuitry 207 through terminals 212 (AUX1) and 216 (VCC). VCC circuitry 207 may supply power to LLC circuitry 205 through terminals 212 and 216.

LLC circuitry 205 may include integrated circuit ("IC") 2108. IC 2108 may be an IC as that available from Monolithic Power Systems, Kirkland, Washington, under the trade name HR1001C LLC with Surge Enhancement. IC 2108 may include a current-sensing pin. The current-sensing pin may include a current-sensing resistor. The current-sensing pin may include a current-sensing capacitor. The current-sensing pin may sense a current on the primary side of circuit 200. LLC circuitry 205 may include current-sensing terminal 218 (CS1). Current-sensing terminal 218 may capture current from the primary side of circuit 200. Current-sensing terminal 218 may transmit the sensed current to the current-sensing pin in IC 2108. The current-sensing pin may enable a mode such as overcurrent regulation, overcurrent protection, and capacitive mode protection. A mode, such as overcurrent regulation, overcurrent protection, and capacitive mode protection, may protect circuit 200 from an overcurrent condition.

LLC circuitry 205 may include capacitor 2150. Capacitor 2150 may be placed across the ground. Capacitor 2150 may be placed between the primary and secondary sides of circuit 200. Capacitor 2150 may be placed between the primary and secondary sides of circuit 200 for EMI suppression.

Figure 5:
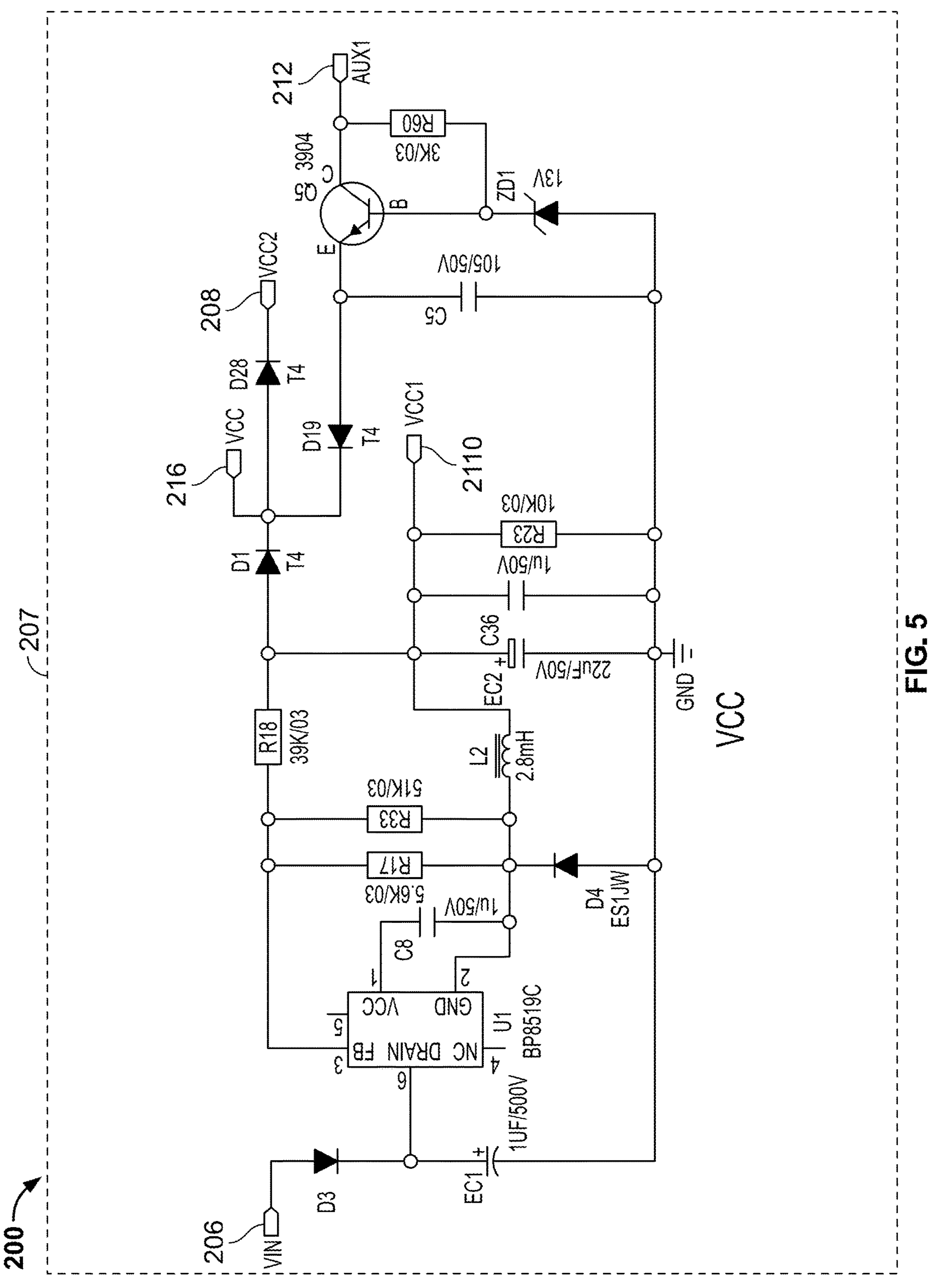
FIG. 5 shows illustrative apparatus in accordance with principles of the invention.

FIG. 5 shows illustrative circuit 200. Circuit 200 may include VCC circuitry 207. VCC circuitry 207 may supply voltage to components of circuit 200. VCC circuitry 207 may receive voltage from EMI circuitry 201. VCC circuitry 207 may receive voltage through terminal 206. VCC circuitry 207 may receive 120 VDC. VCC circuitry may receive any suitable voltage. VCC circuitry may step-down the voltage received through terminal 206. VCC circuitry 207 may not step-down voltage received through terminal 206. VCC circuitry 207 may provide supply voltage through terminals 216, 208, 212, and 2110. The supply voltage may be uniform through terminals 216, 208, 212 and 2110. The supply voltage may be different through terminals 216, 208, 212 and 2110.

Figure 6:
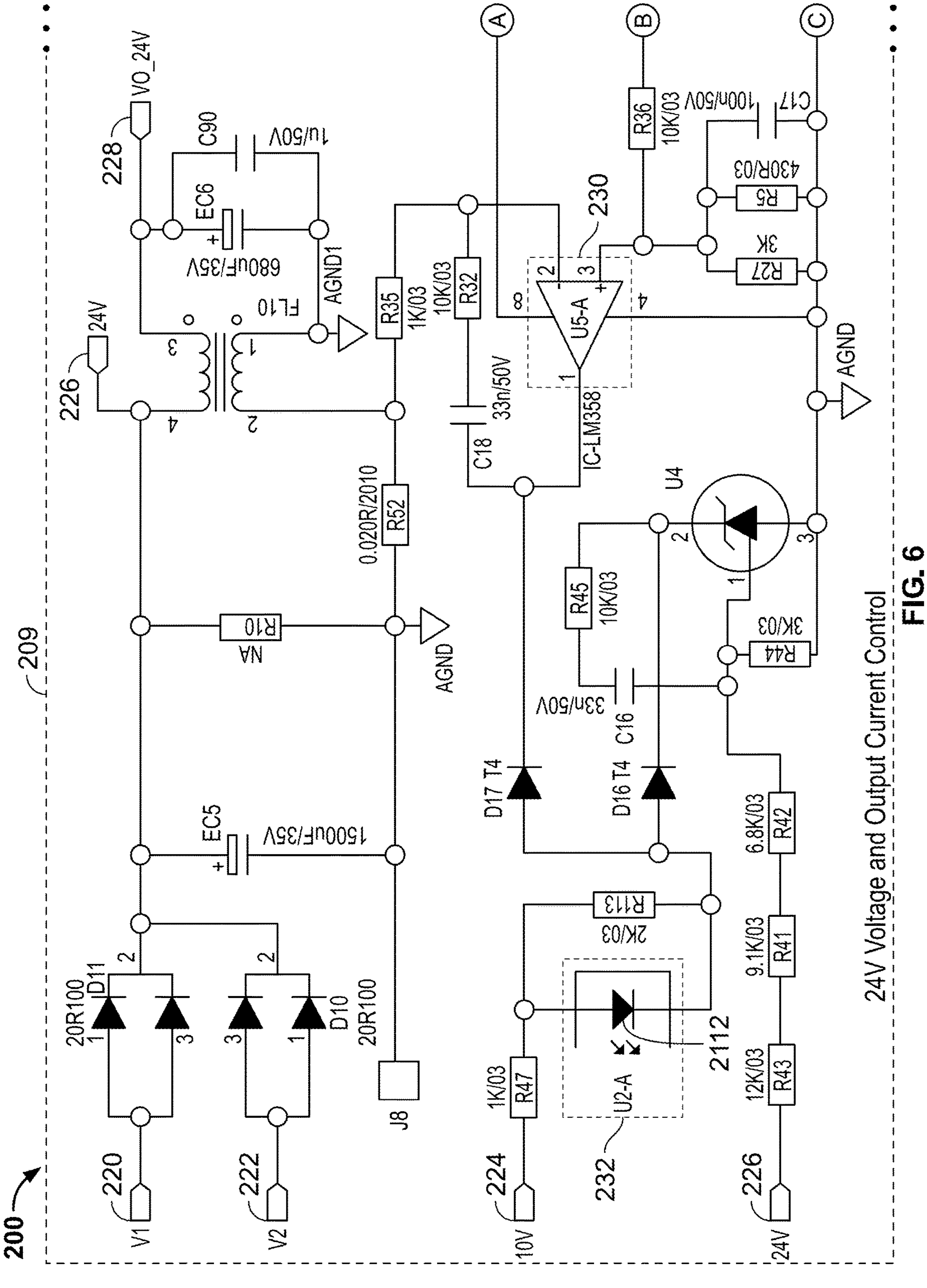
FIG. 6 shows illustrative apparatus in accordance with principles of the invention.
Figure 6:
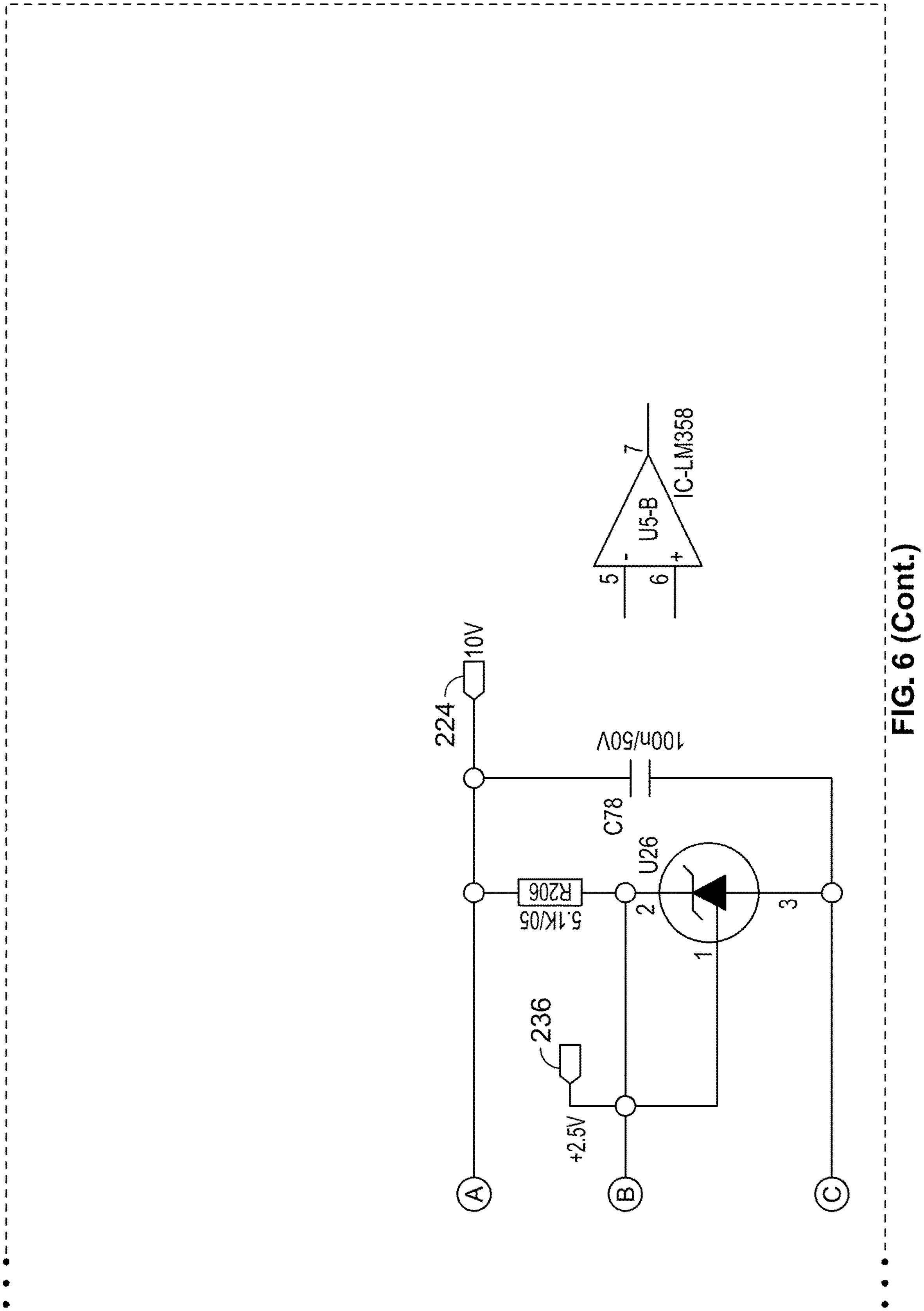

FIG. 6 shows illustrative circuit 200. Circuit 200 may include protection circuitry 209. Protection circuitry 209 may prevent an overcurrent condition in current regulated output channels 215, 217, 219, 221, 223, and 225. Protection circuitry 209 may receive voltage from LLC circuitry 205. Protection circuitry 209 may receive voltage through terminals 220 and 222. Protection circuitry 209 may be on the secondary side of circuit 200. Protection circuitry 209 may receive power from secondary VCC circuitry 211. Secondary VCC circuitry 211 may provide supply voltage on the secondary side of circuit 200. Secondary VCC circuitry 211 may transmit 10 VDC to protection circuit 209. Secondary VCC circuitry 211 may transmit 10 VDC to protection circuit 209 through terminal 224.

Protection circuitry 209 may be connected to quick discharge circuitry 213. Protection circuitry 209 may be connected to quick discharge circuitry 213 through terminal 226.

Protection circuitry 209 may include operational amplifier 230 (U5-A). Operational amplifier 230 may be an operational amplifier such as that available from Texas Instruments, Dallas, Texas, under the trade name LM358. Operational amplifier 230 may include an inverting amplifier. Circuitry around operational amplifier 230 may include a current loop. The circuitry may set a maximum output current. The circuitry may limit the current in abnormal states, such as overload, short circuit, and any other suitable abnormal state.

Voltage may be transmitted from terminals 220 and 222 to a negative terminal (2) of operational amplifier 230. The voltage flowing through the negative terminal (2) may be compared to the voltage of a positive terminal (3) of operational amplifier 230. Positive terminal (3) may be a reference voltage. The reference voltage may be calculated from a voltage divider including resistors R27, R5, and R36 and voltage 236 (2.5 VDC).

When the voltage of negative terminal (2) is greater than the voltage in the positive terminal (3), current may flow to photocoupler 232. The current may flow to light emitter 2112 of photocoupler 232. Light emitter 2112 may transmit current to phototransistor 2114 included in photocoupler 232. Phototransistor 2114 may be disposed in LLC circuitry 205. The current may flow from phototransistor 2114 to the ground. The flow of current to the ground may regulate the voltage. Keeping the voltage regulated may enable current control of current regulated output channels 215, 217, 219, 221, 223, and 225.

When the voltage of positive terminal (3) is greater than the voltage in negative terminal (2), the output voltage may be a high voltage. Because of the high voltage output, current may not flow through photocoupler 232. When the output is a high voltage, the current may continue flowing through protection circuitry 209 to current regulated output channels 215, 217, 219, 221, 223, and 225.

Protection circuitry 209 may output a regulated voltage of 24 VDC on the secondary side of circuit 200. Protection circuitry 209 may output a voltage of 24 VDC through terminal 228. Protection circuitry may output a voltage of 24 VDC through terminal 228 to current regulated output channels 215, 217, 219, 221, 223, and 225.

Figure 7:
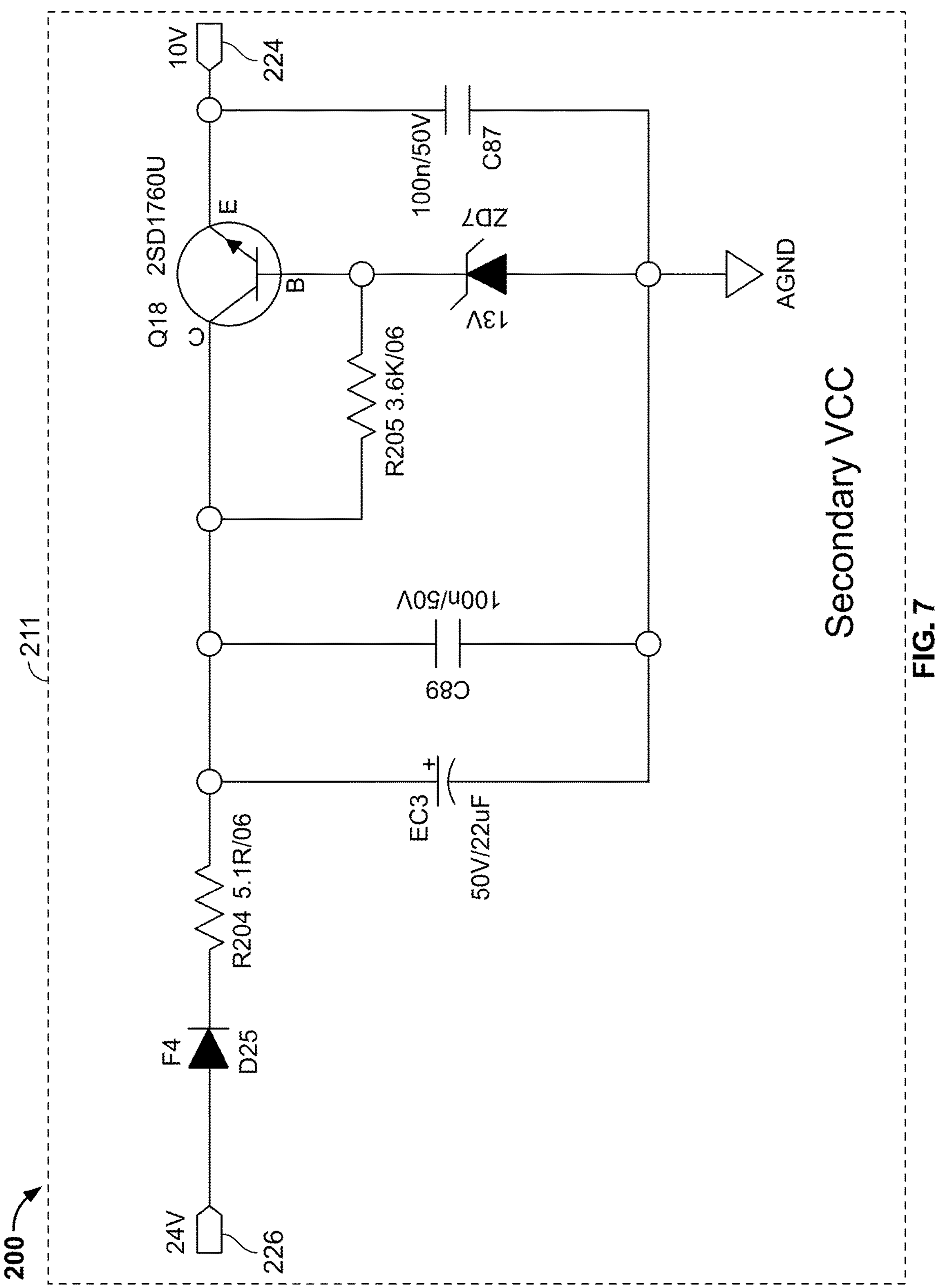
FIG. 7 shows illustrative apparatus in accordance with principles of the invention.

FIG. 7 shows illustrative circuit 200. Circuit 200 may include secondary VCC circuitry 211. Secondary VCC circuitry 211 may provide supply voltage to different circuit components included in the secondary side of circuit 200. Secondary VCC circuitry 211 may receive voltage through terminal 226. Secondary VCC circuitry 211 may receive 24 VDC through terminal 226. Secondary VCC circuitry may step-down the received 24 VDC to output 10 VDC. Secondary VCC circuitry 211 may include low drop-out regulator ("LDO") circuitry. Secondary VCC circuitry 211 may use the low drop-out regulator circuitry to step-down the 24V. Secondary VCC circuitry 211 may output 10 VDC through terminal 224.

Figure 8:
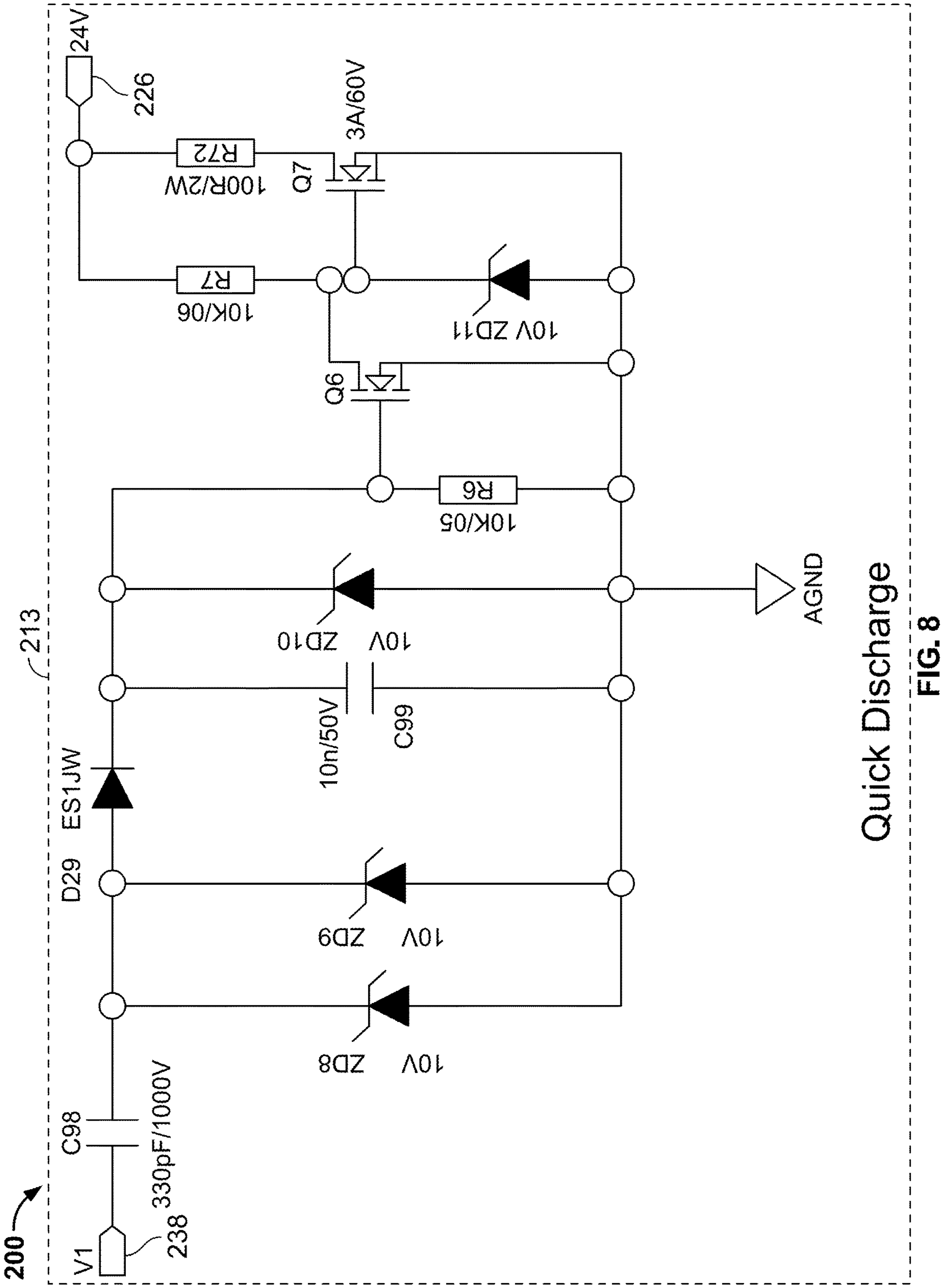
FIG. 8 shows illustrative apparatus in accordance with principles of the invention.

FIG. 8 shows illustrative circuit 200. Circuit 200 may include quick discharge circuitry 213. Quick discharge circuitry 213 may receive voltage through terminal 238. Quick discharge circuitry 213 may receive voltage from LLC circuitry 205. Quick discharge circuitry 213 may discharge energy faster from an output capacitor when there is no voltage flowing through terminal 238. Quick discharge circuitry 213 may reduce the VCC voltage of microcontroller 227 to below working voltage within one second. Quick discharge circuitry 213 may reduce the VCC voltage of microcontroller 227 to below working voltage within any suitable amount of time. Quick discharge circuitry 213 may output a voltage of 24 VDC. Quick discharge circuitry 213 may output a voltage of 24 VDC through terminal 226.

Figure 9A:
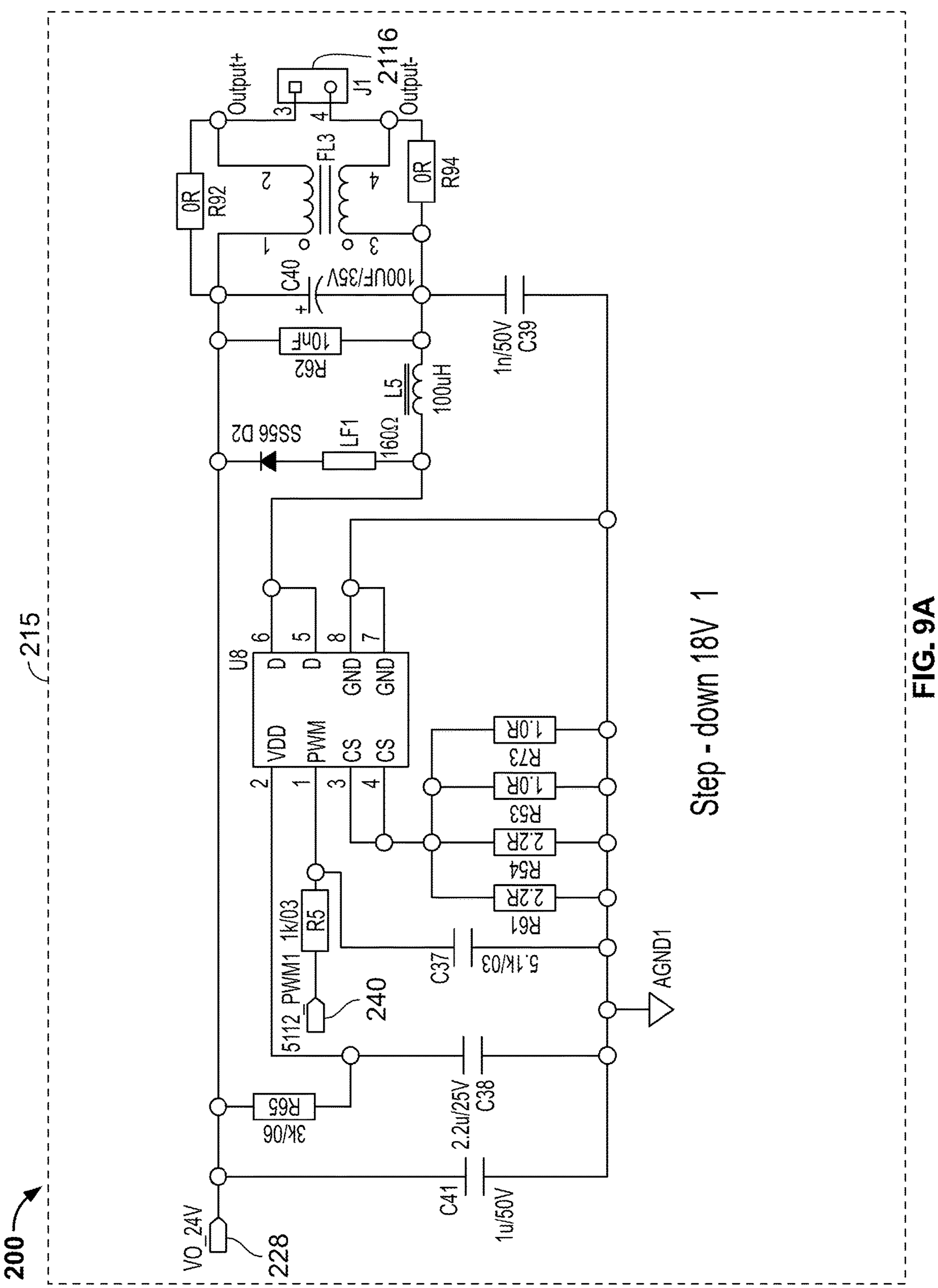
FIG. 9A shows illustrative apparatus in accordance with principles of the invention.

FIG. 9A shows illustrative circuit 200. Circuit 200 may include current regulated output channel 215. Current regulated output channel 215 may receive an input of voltage of 24 VDC. Current regulated output channel 215 may receive an input voltage of 24 VDC through terminal 228. Current regulated output channel 215 may receive an input voltage of 24 VDC through terminal 228 from power protection circuitry 209. Current regulated output channel 215 may include buck converter circuitry. The buck converter circuitry may step-down the voltage. The buck converter circuitry may step down the voltage from 24 VDC to 18 VDC.

Current regulated output channel 215 may include terminal 240 (PWM1). Terminal 240 may be a PWM terminal. Current regulated output channel 215 may be in electronic communication with microcontroller 227. Current regulated output channel 215 may be in electronic communication with microcontroller 227 through terminal 240. Terminal 240 may transmit signals from microcontroller 227. The signals may include dimming signals. The signals may include correlated color temperature ("CCT") signals. The signals may include any suitable lighting control signal.

Current regulated output channel 215 may output a current through output jack 2116. Output jack 2116 may connect to one or more LED modules. The one or more LED modules may each include one or more LEDs. Current regulated output channel 215 may output a current regulated based on a PWM signal transmitted through terminal 240.

Figure 9B:
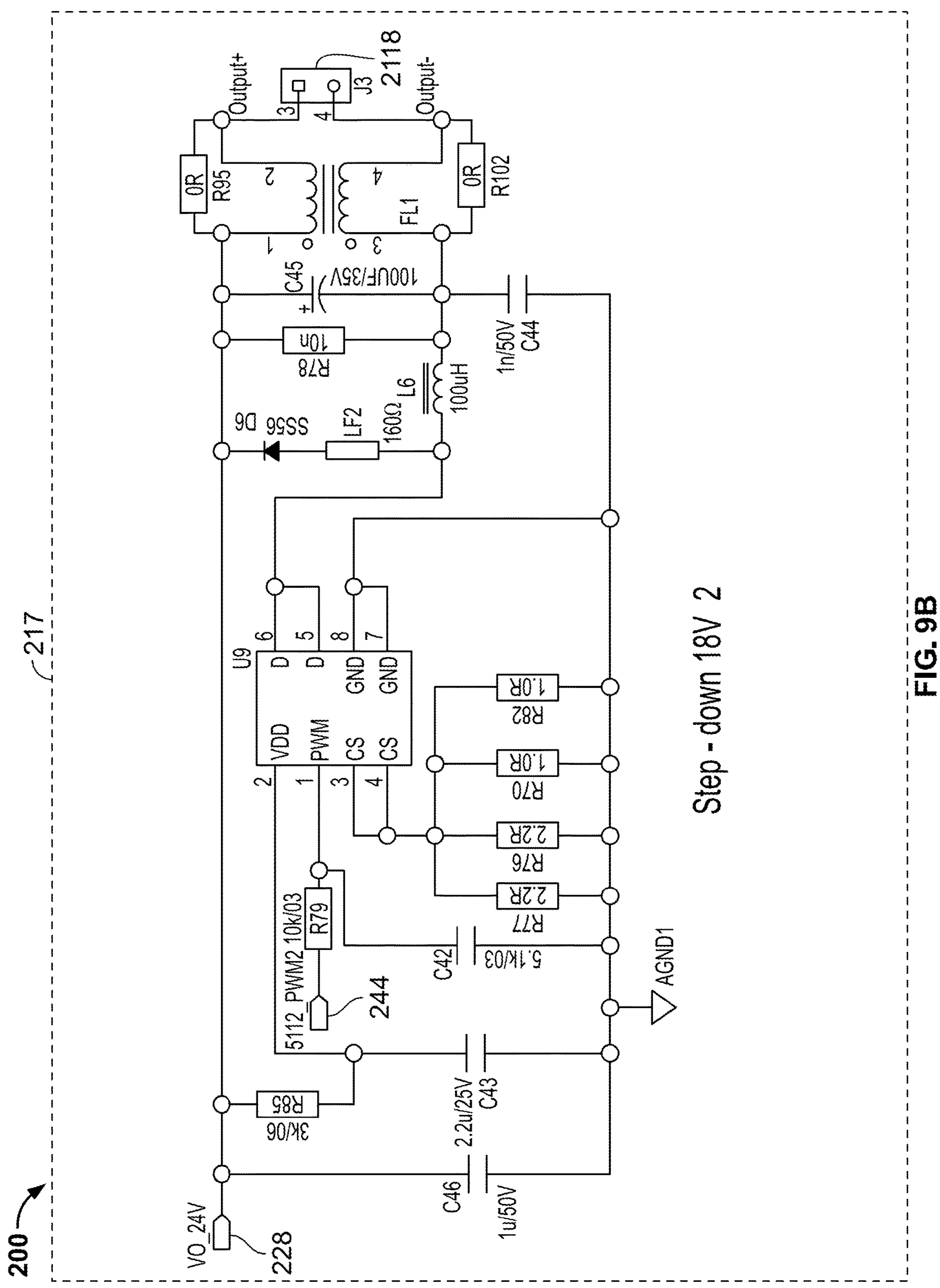
FIG. 9B shows illustrative apparatus in accordance with principles of the invention.

FIG. 9B shows illustrative circuit 200. Circuit 200 may include current regulated output channel 217. Current regulated output channel 217 may receive an input of voltage of 24 VDC. Current regulated output channel 217 may receive an input voltage of 24 VDC through terminal 228. Current regulated output channel 217 may receive an input voltage of 24 VDC through terminal 228 from power protection circuitry 209. Current regulated output channel 217 may include buck converter circuitry. The buck converter circuitry may step-down the voltage. The buck converter may step-down the voltage from 24 VDC to 18 VDC.

Current regulated output channel 217 may include terminal 244 (PWM2). Terminal 244 may be a PWM terminal. Current regulated output channel 217 may be in electronic communication with microcontroller 227. Current regulated output channel 217 may be in electronic communication with microcontroller 227 through terminal 244. Terminal 244 may transmit signals from microcontroller 227. The signals may include dimming signals. The signals may include CCT signals. The signals may include any suitable lighting control signal.

Current regulated output channel 217 may output a current through output jack 2118. Output jack 2118 may connect to one or more LED modules. The one or more LED modules may each include one or more LEDs. Current regulated output channel 217 may output a current regulated based on a PWM signal transmitted through terminal 244.

Figure 9C:
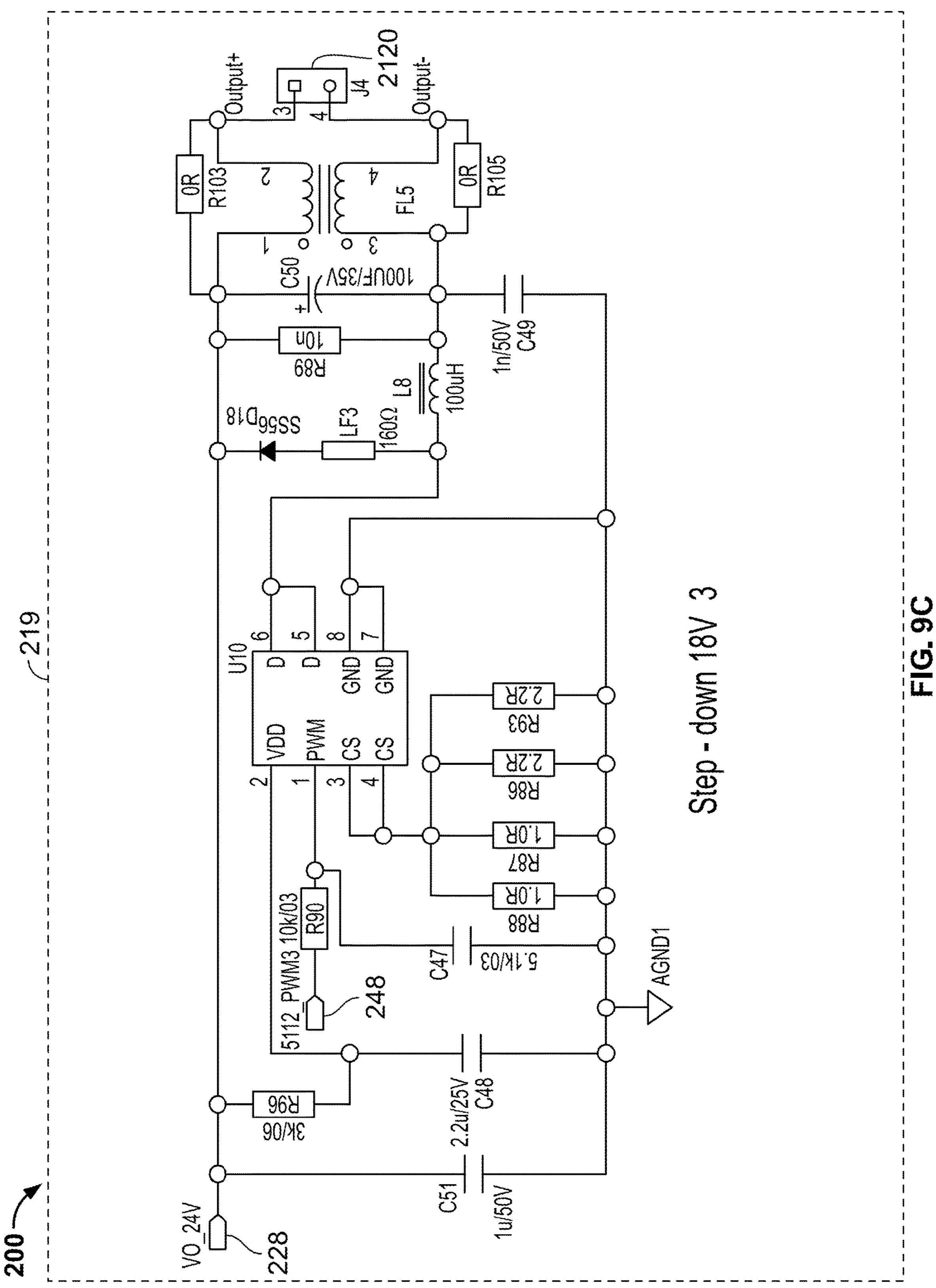
FIG. 9C shows illustrative apparatus in accordance with principles of the invention.

FIG. 9C shows illustrative circuit 200. Circuit 200 may include current regulated output channel 219. Current regulated output channel 219 may receive an input of voltage of 24 VDC. Current regulated output channel 219 may receive an input voltage of 24 VDC through terminal 228. Current regulated output channel 219 may receive an input voltage of 24 VDC through terminal 228 from power protection circuitry 209. Current regulated output channel 219 may include buck converter circuitry. The buck converter circuitry may step-down the voltage. The buck converter circuitry may step-down the voltage from 24 VDC to 18 VDC.

Current regulated output channel 219 may include terminal 248 (PWM3). Terminal 248 may be a PWM terminal. Current regulated output channel 219 may be in electronic communication with microcontroller 227. Current regulated output channel 219 may be in electronic communication with microcontroller 227 through terminal 248. Terminal 248 may transmit signals from microcontroller 227. The signals may include dimming signals. The signals may include CCT signals. The signals may include any suitable lighting control signal.

Current regulated output channel 219 may output a current through output jack 2120. Output jack 2120 may connect to one or more LED modules. The one or more LED modules may each include one or more LEDs. Current regulated output channel 219 may output a current regulated based on a PWM signal transmitted through terminal 248.

Figure 9D:
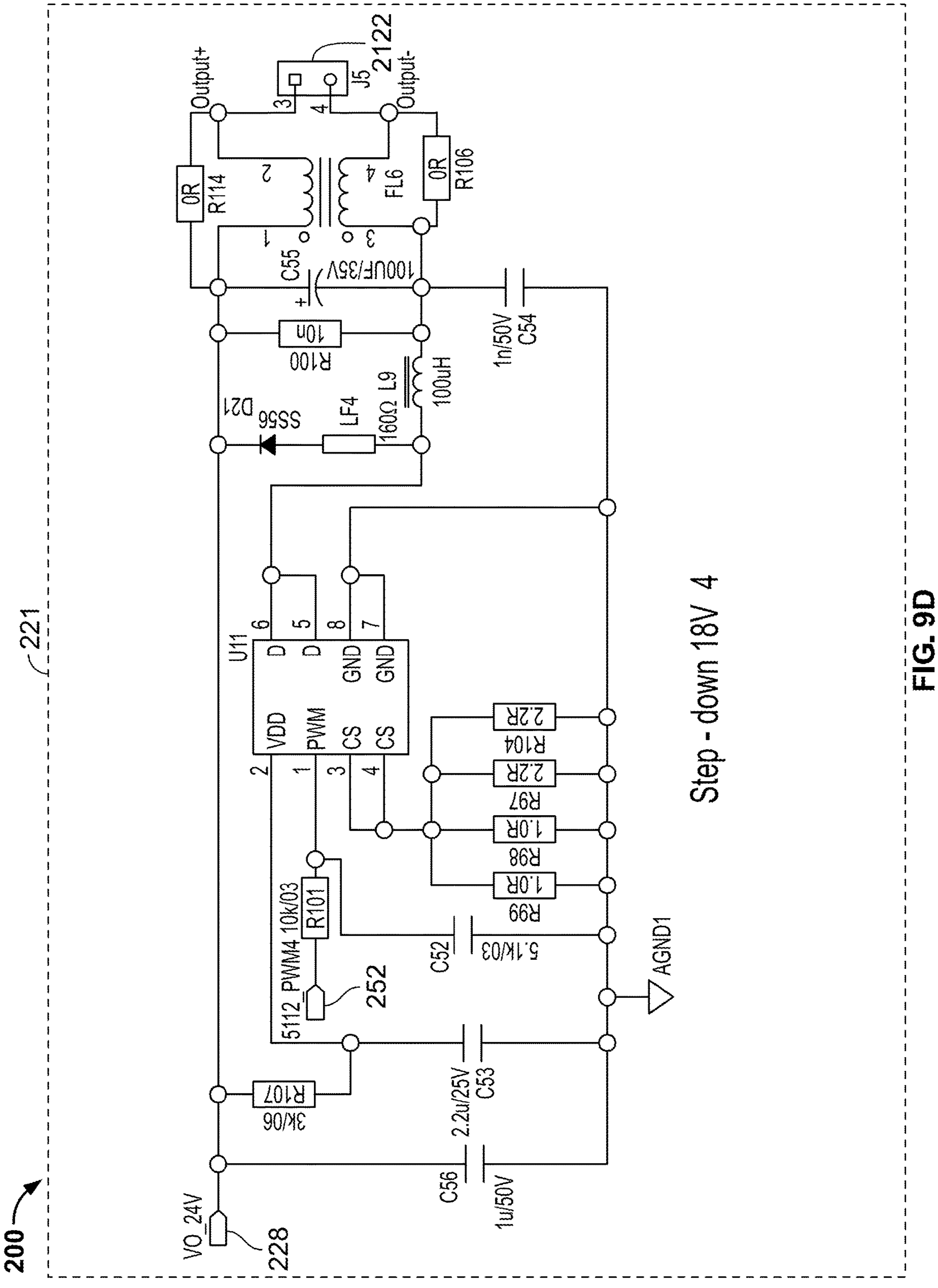
FIG. 9D shows illustrative apparatus in accordance with principles of the invention.

FIG. 9D shows illustrative circuit 200. Circuit 200 may include current regulated output channel 221. Current regulated output channel 221 may receive an input of voltage of 24 VDC. Current regulated output channel 221 may receive an input voltage of 24 VDC through terminal 228. Current regulated output channel 221 may receive an input voltage of 24 VDC through terminal 228 from power protection circuitry 209. Current regulated output channel 221 may include buck converter circuitry. The buck converter circuitry may step-down the voltage. The buck converter circuitry may step-down the voltage from 24 VDC to 18 VDC.

Current regulated output channel 221 may include terminal 252 (PWM4). Terminal 252 may be a PWM terminal. Current regulated output channel 221 may be in electronic communication with microcontroller 227. Current regulated output channel 221 may be in electronic communication with microcontroller 227 through terminal 252. Terminal 252 may transmit signals from microcontroller 227. The signals may include dimming signals. The signals may include CCT signals. The signals may include any suitable lighting control signal.

Current regulated output channel 221 may output a current through output jack 2122. Output jack 2122 may connect to one or more LED modules. The one or more LED modules may each include one or more LEDs. Current regulated output channel 221 may output a current regulated based on a PWM signal transmitted through terminal 252.

Figure 9E:
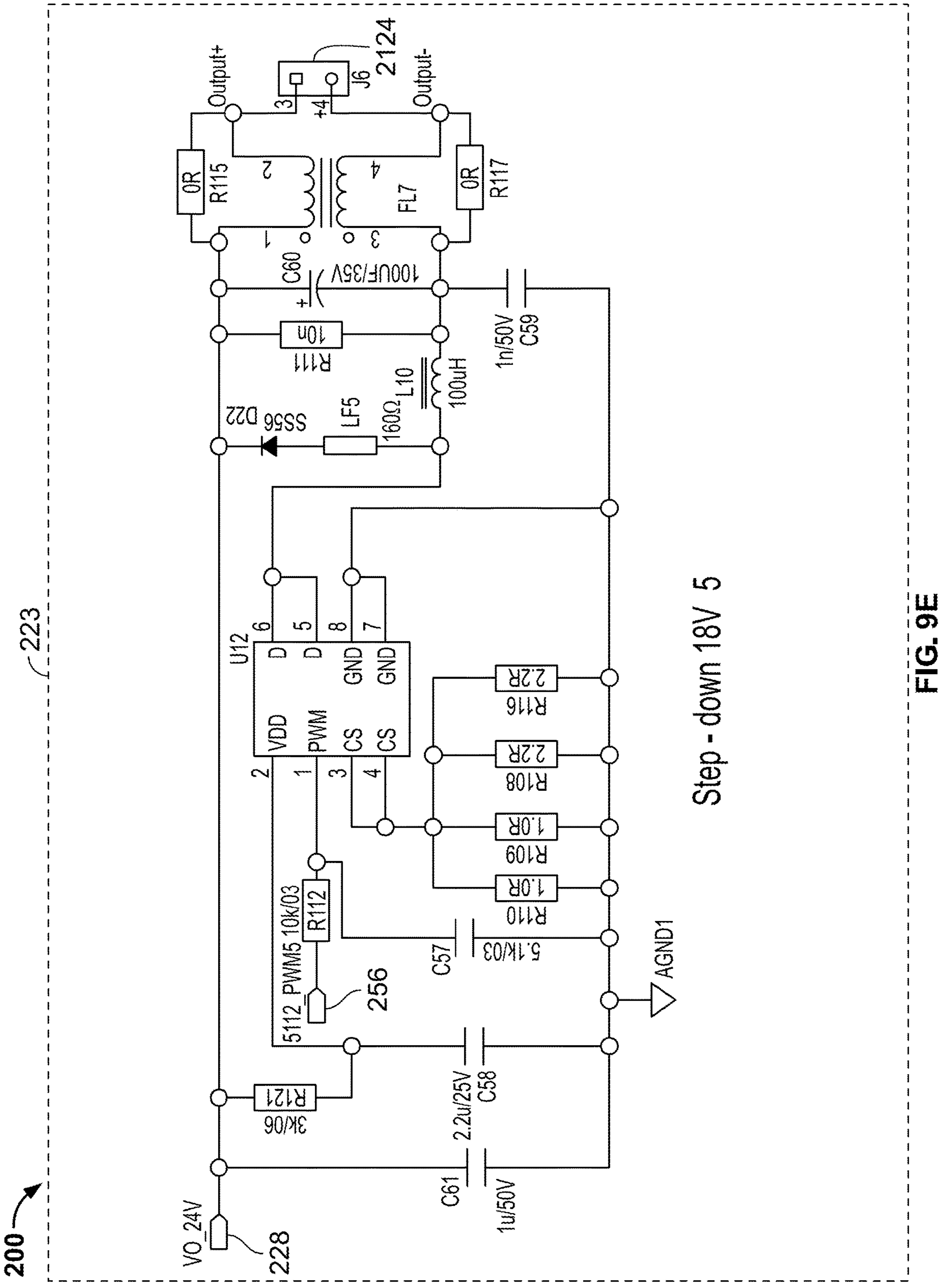
FIG. 9E shows illustrative apparatus in accordance with principles of the invention.

FIG. 9E shows illustrative circuit 200. Circuit 200 may include current regulated output channel 223. Current regulated output channel 223 may receive an input of voltage of 24 VDC. Current regulated output channel 223 may receive an input voltage of 24 VDC through terminal 228. Current regulated output channel 223 may receive an input voltage of 24 VDC through terminal 228 from power protection circuitry 209. Current regulated output channel 223 may include buck converter circuitry. The buck converter circuitry may step-down the voltage. The buck converter circuitry may step-down the voltage from 24 VDC to 18 VDC.

Current regulated output channel 223 may include terminal 256 (PWM5). Terminal 256 may be a PWM terminal. Current regulated output channel 223 may be in electronic communication with microcontroller 227. Current regulated output channel 223 may be in electronic communication with microcontroller 227 through terminal 256. Terminal 256 may transmit signals from microcontroller 227. The signals may include dimming signals. The signals may include CCT signals. The signals may include any suitable lighting control signal.

Current regulated output channel 223 may output a current through output jack 2124. Output jack 2124 may connect to one or more LED modules. The one or more LED modules may each include one or more LEDs. Current regulated output channel 223 may output a current regulated based on a PWM signal transmitted through terminal 256.

Figure 9F:
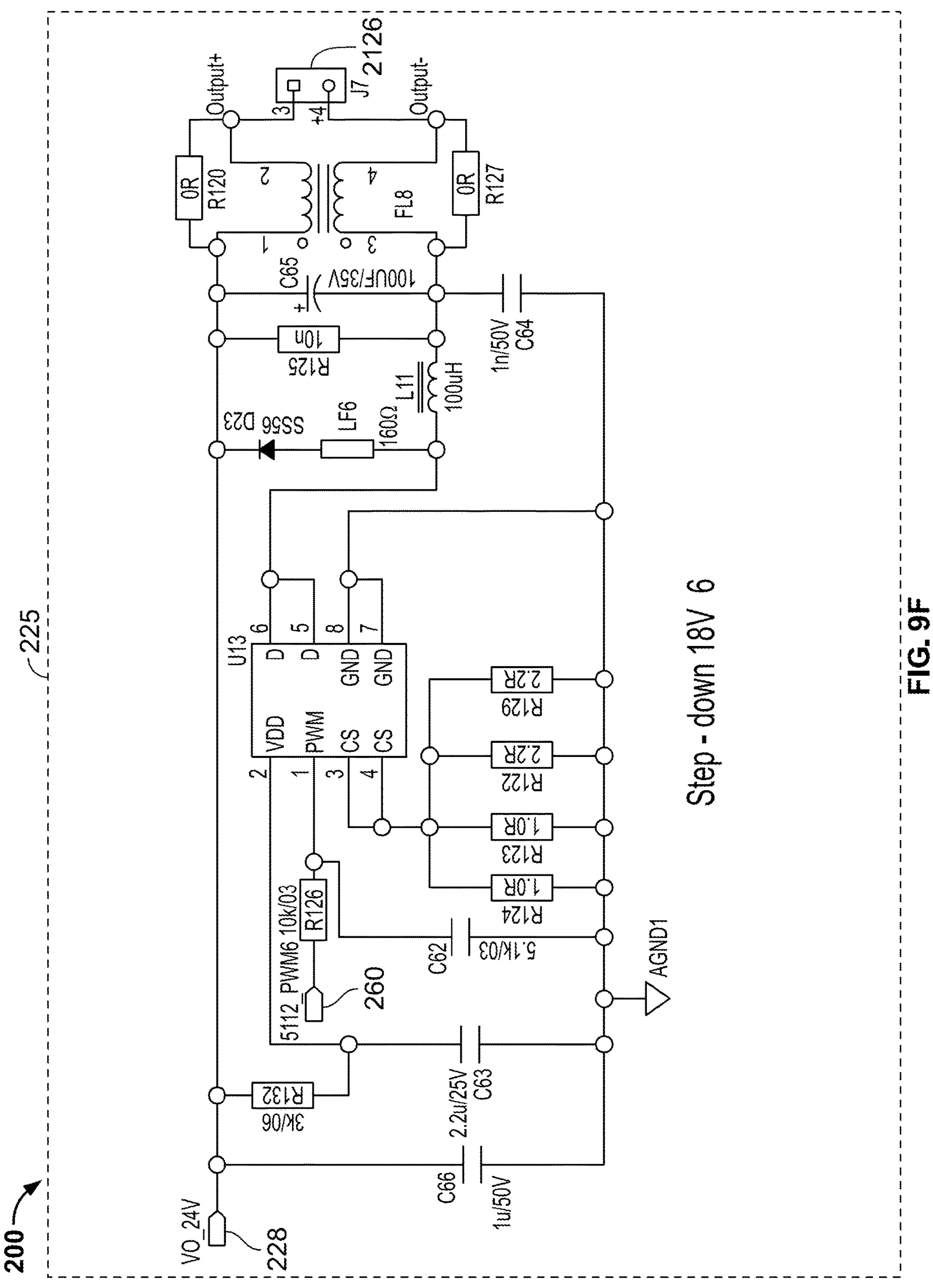
FIG. 9F shows illustrative apparatus in accordance with principles of the invention.

FIG. 9F shows illustrative circuit 200. Circuit 200 may include current regulated output channel 225. Current regulated output channel 225 may receive an input of voltage of 24 VDC. Current regulated output channel 225 may receive an input voltage of 24 VDC through terminal 228. Current regulated output channel 225 may receive an input voltage of 24 VDC through terminal 228 from power protection circuitry 209. Current regulated output channel 225 may include buck converter circuitry. The buck converter may step down the voltage. The buck converter may step down the voltage from 24 VDC to 18 VDC.

Current regulated output channel 225 may include terminal 260 (PWM6). Terminal 260 may be a PWM terminal. Current regulated output channel 225 may be in electronic communication with microcontroller 227. Current regulated output channel 225 may be in electronic communication with microcontroller 227 through terminal 260. Terminal 260 may transmit signals from microcontroller 227. The signals may include dimming signals. The signals may include CCT signals. The signals may include any suitable lighting control signal.

Current regulated output channel 225 may output a current through output jack 2126. Output jack 2126 may connect to one or more LED modules. The one or more LED modules may each include one or more LEDs. Current regulated output channel 225 may output a current regulated based on a PWM signal transmitted through terminal 260.

Figure 10:
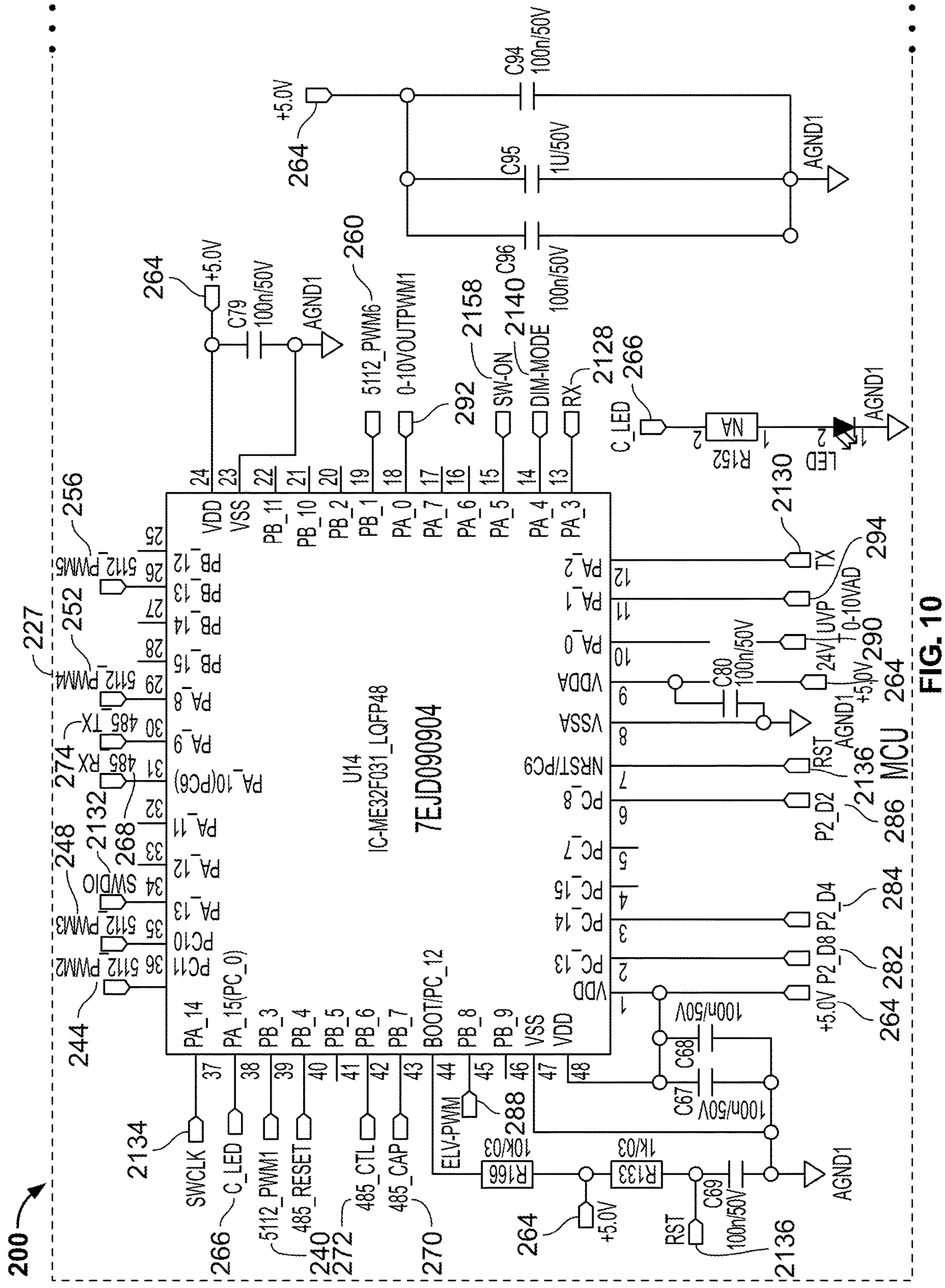
FIG. 10 shows illustrative apparatus in accordance with principles of the invention.
Figure 10:
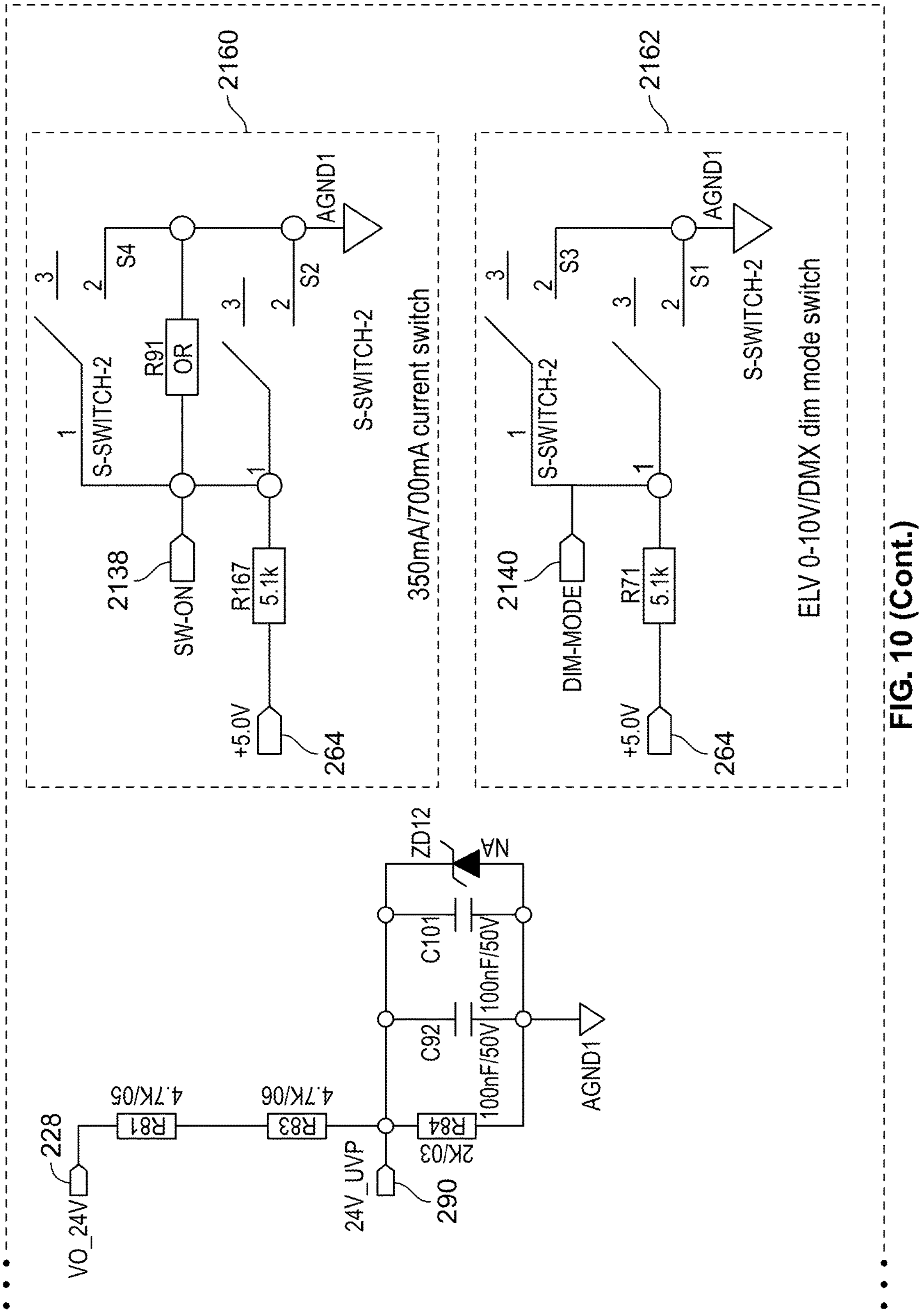

FIG. 10 shows illustrative circuit 200. Circuit 200 may include microcontroller 227. Microcontroller 227 may be a microcontroller such as that available from Minsi Microelectronics, China, model ME32F031C8T6.

Microcontroller 227 may receive an input voltage of 5 VDC. Microcontroller 227 may receive the input voltage through terminal 264. Microcontroller 227 may receive the input voltage from microcontroller VCC circuitry 229. The input voltage may power microcontroller 227.

Microcontroller 227 may be in electronic communication with dimming circuitry including DMX circuitry 231, TRIAC/ELV circuitry 233, and 0-10V circuitry 235.

Microcontroller 227 may be in electronic communication with DMX circuitry 231 through terminals 268 (485_RX), 270 (485_CAP), 272 (485_CTL), 274 (485_TX), and 276 (485_RESET). DMX circuitry 227 may send a DMX signal to microcontroller 227 through terminals 268, 270, 272, 274 and 276. Microcontroller 227 may transmit the DMX signal to current regulated output channels 215, 217, 219, 221, 223, and 225. The DMX signal may control the dimming level of LED modules connected to current regulated output channels 215, 217, 219, 221, 223, and 225 using a DMX protocol.

Microcontroller 227 may be in electronic communication with TRIAC/ELV circuitry 233 through terminal 288 (ELV_PWM). ELV/TRIAC circuitry 233 may transmit a TIRAC/ELV signal to microcontroller 227 through terminal 288. Microcontroller 227 may transmit the TRIAC/ELV signal to current regulated output channels 215, 217, 219, 221, 223, and 225. The TRIAC/ELV signal may control the dimming level of LED modules connected to current regulated output channels 215, 217, 219, 221, 223, and 225 using a TRIAC/ELV phase-cut.

Microcontroller 227 may be in electronic communication with 0-10V circuitry 235. Microcontroller 227 may be in electronic communication with 0-10V circuitry 235 through terminals 292 (0-10VOUTPWM1) and 294 (0-10VAD). 0-10V circuitry 235 may transmit a 0-10V signal to microcontroller 227 through terminals 292 and 294. Microcontroller 227 may transmit the 0-10V signal to current regulated output channels 215, 217, 219, 221, 223, and 225. The 0-10V signal may control the dimming level of LED modules connected to current regulated output channels 215, 217, 219, 221, 223, and 225 using the 0-10V signal.

Microcontroller 227 may throttle current to one or more of current regulated output channels 215, 217, 219, 221, 223, and 225 through PWM terminals 240, 244, 248, 252, 256 and 260 respectively. The current may be throttled based on signals received from the dimming circuitry included in circuit 200. Microcontroller 227 may prevent current transmission to one or more current regulated output channels 215, 217, 219, 221, 223, and/or 225.

Microcontroller 227 may limit current transmission to one or more current regulated output channels 215, 217, 219, 221, 223, and/or 225. Microcontroller 227 may increase current transmission to one or more current regulated output channels 215, 217, 219, 221, 223, and/or 225.

Microcontroller 227 may receive dimming curve setting information from dimming curve selection circuitry 237. Microcontroller 227 may receive dimming curve setting information from dimming curve selection circuitry 237 through terminals 282 (P2_D8), 284 (P2_D4), and 286 (P2_D2). Microcontroller 227 may store a dimming curve corresponding to the received dimming curve setting information. Microcontroller 227 may apply the stored dimming curve to the PWM signals transmitted to current regulated output channels 215, 217, 219, 221, 223, and/or 225.

Microcontroller 227 may include terminals 2128 (RX), 2130 (TX), 2132 (SWIDO), and 2134 (SWCLK). Terminals 2128, 2130, 2132 and 2134 may be used for data transmission. Microcontroller 227 may include terminal 290 (24V_UVP). Terminal 290 may be used to transmit a feedback signal. The feedback signal may give feedback to microcontroller 227. The feedback signal may give feedback to microcontroller 227 to check whether or not the 24 VDC is stable. Microcontroller 227 may include terminal 266 (C-LED) connecting microcontroller 227 to an LED. Microcontroller 227 may include terminal 2136 (RST) to connect microcontroller 227 to reset circuitry.

Microcontroller 227 may include terminal 2158 (SW_ON). Terminal 2158 may connect microcontroller 227 to switch 2160. Switch 2160 may be a 350 mA/700 mA current switch. Switch 2160 may enable a user to select an output current option. The current options may include 700 mA, 650 mA, 600 mA, 550 mA and any other suitable current. Microcontroller 227 may include terminal 2140 (DIM_MODE). Terminal 2140 may connect microcontroller 227 to switch 2162. Switch 2162 may be an ELV/0-10V/DMX dim mode switch. Switch 2162 may enable a user to select a dimming mode.

Figure 11:
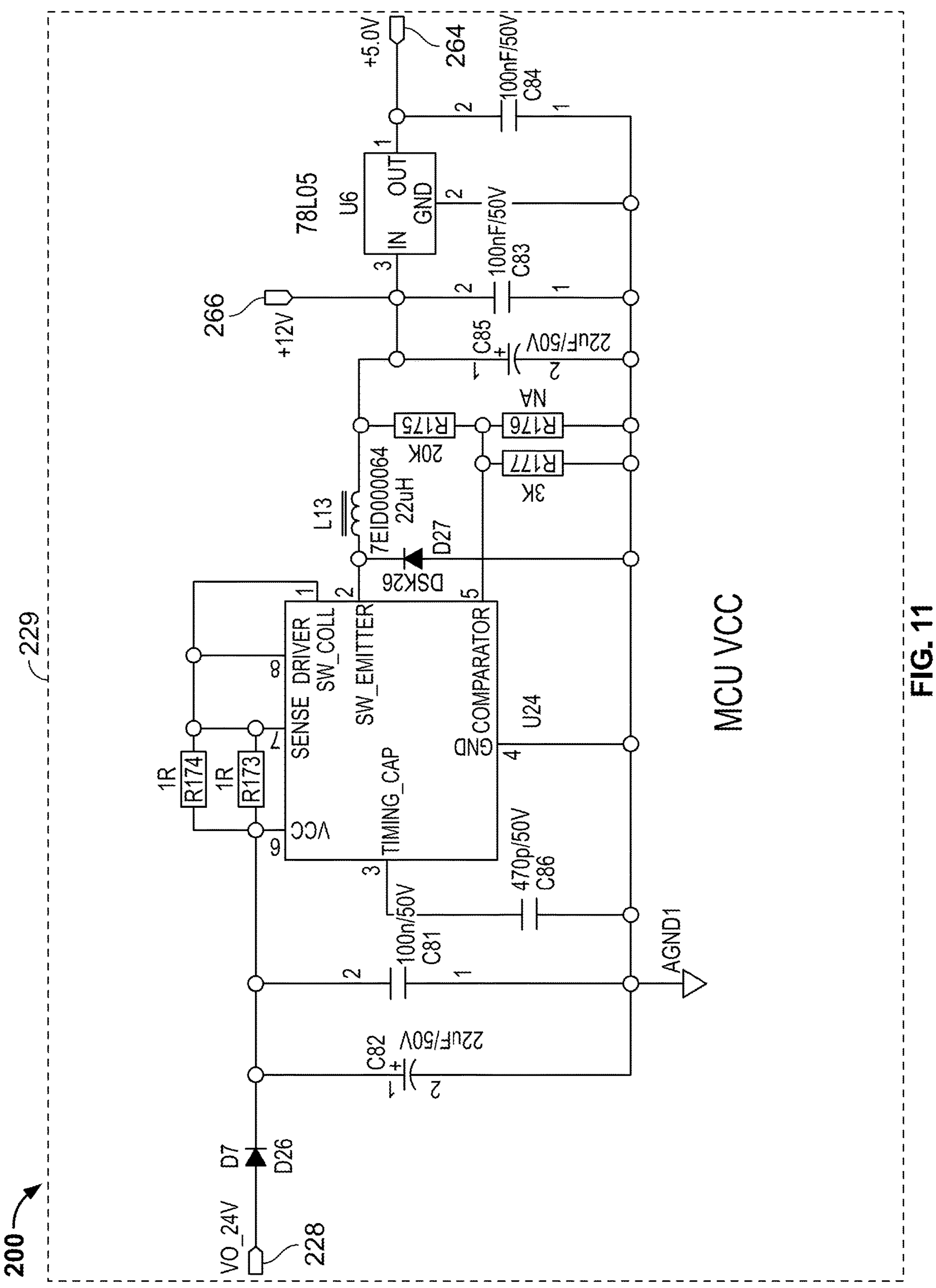
FIG. 11 shows illustrative apparatus in accordance with principles of the invention.

FIG. 11 shows illustrative circuit 200. Circuit 200 may include microcontroller VCC circuitry 229. Microcontroller VCC circuitry 229 may provide supply voltage to microcontroller 227. Microcontroller VCC circuitry 229 may receive voltage from protection circuitry 209. Microcontroller VCC circuitry 229 may receive voltage through terminal 228. Microcontroller VCC circuitry 229 may receive 24 VDC. Microcontroller VCC circuitry 229 may receive any suitable voltage. Microcontroller VCC circuitry 229 may step-down the voltage received through terminal 228. Microcontroller VCC circuitry 229 may step-down the voltage to 12 VDC. Microcontroller VCC circuitry 229 may step-down the voltage to 5 VDC. Microcontroller VCC circuitry 229 may transmit the 12 VDC through terminal 266. Microcontroller VCC circuitry 229 may transmit the 5 VDC through terminal 264.

Figure 12:
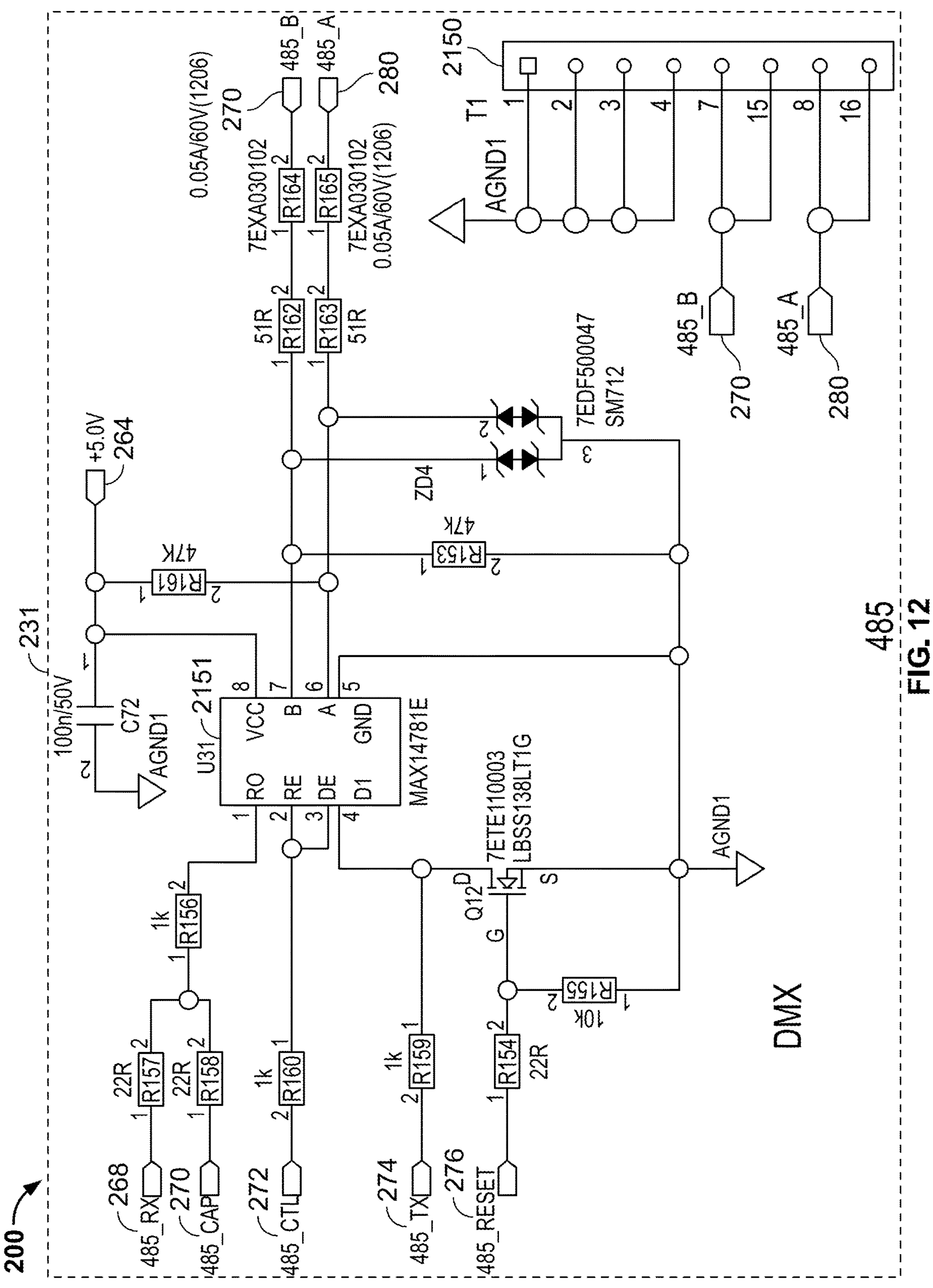
FIG. 12 shows illustrative apparatus in accordance with principles of the invention.

FIG. 12 shows illustrative circuit 200. Circuit 200 may include DMX circuitry 231. DMX circuitry 231 may dim the LED modules using a DMX protocol. The DMX protocol may transmit DMX signals using a RS-485 communication system. RS-485 communication system may include two data lines, data line 278 (485B) and data line 280 (485A). DMX circuitry 231 may transmit DMX dimming signals to one or more of the LED modules connected to current regulated output channels 215, 217, 219, 221, 223, and 225. DMX circuitry 231 may receive user selected dimming levels for each LED from microcontroller 227. DMX circuitry 231 may receive user selected dimming levels for each LED from microcontroller 227 through terminals 268 (485_RX), 270 (485_CAP), 272 (485_CTL), 274 (485_TX), and 276 (485_RESET).

DMX circuitry 231 may include IC 2151. IC 2151 may be a RS-485 transceiver. IC 2151 may translate user selected dimming levels received from microcontroller 227 into signals transmitted using data lines 278 and 280. IC 2151 may output signals to data lines 278 and 280. IC 2151 may be powered through terminal 264.

Figure 13:
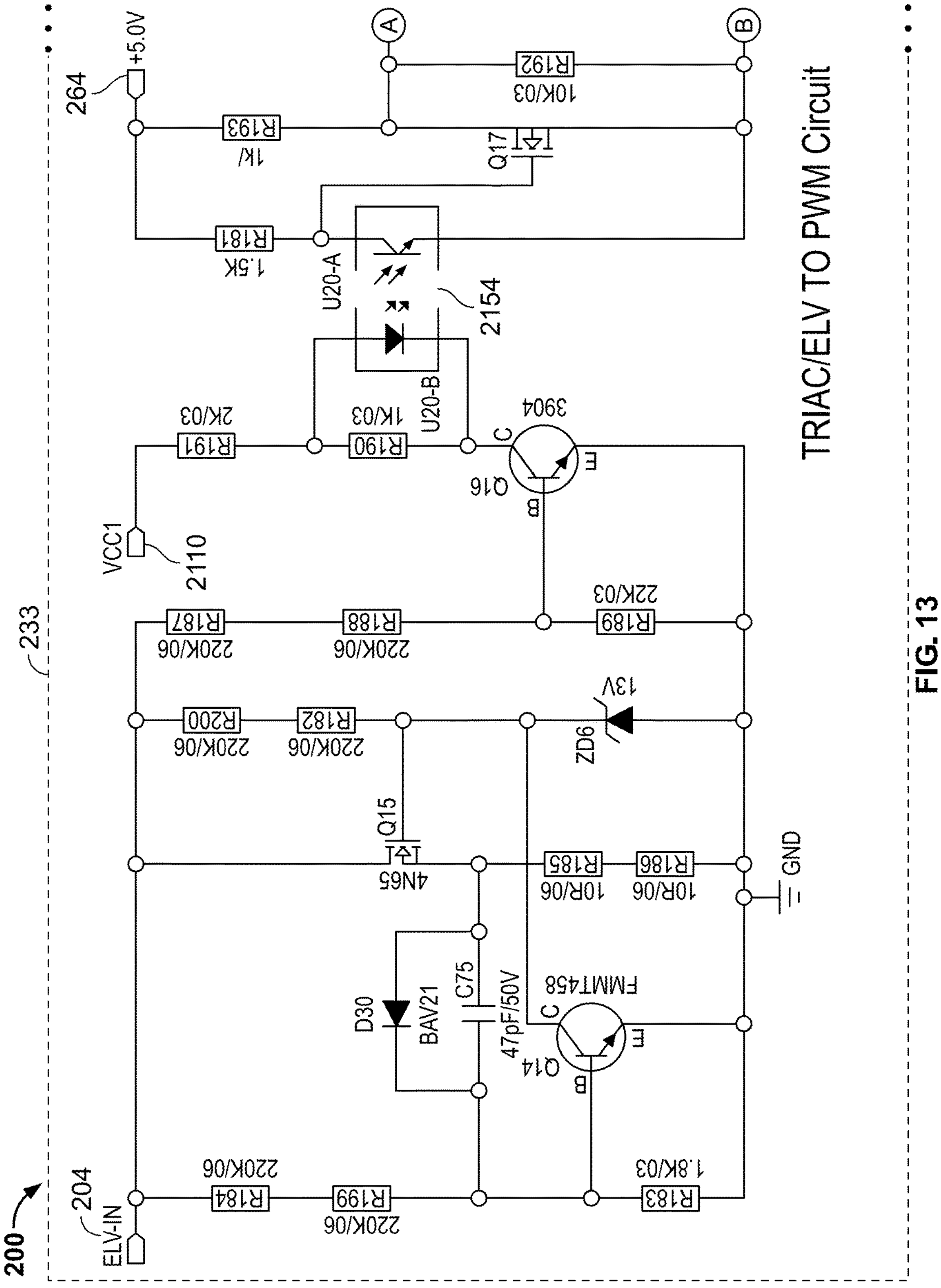
FIG. 13 shows illustrative apparatus in accordance with principles of the invention.
Figure 13:
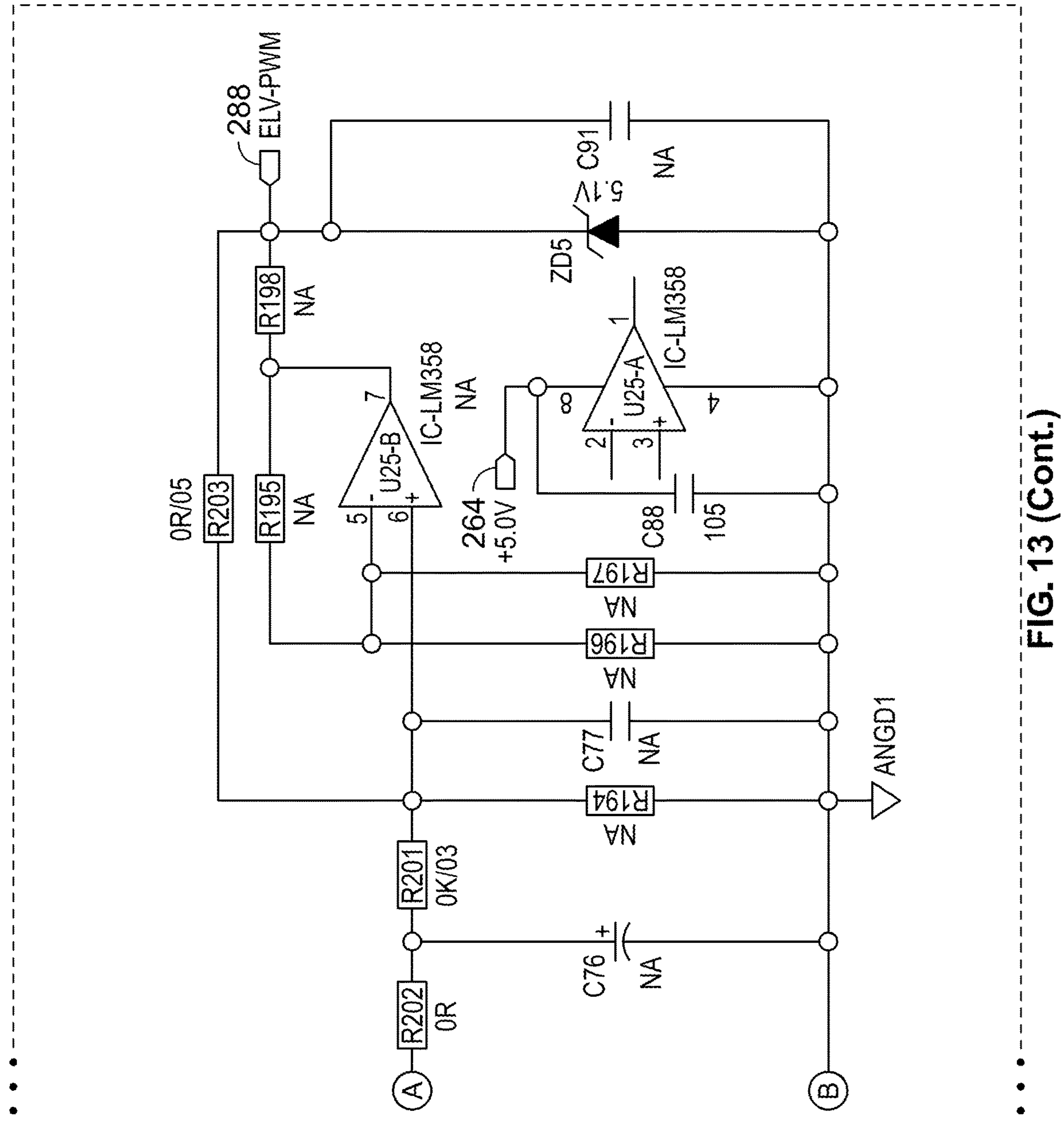

FIG. 13 shows illustrative circuit 200. Circuit 200 may include TRIAC/ELV circuitry 233. TIRAC/ELV circuitry 233 may receive AC voltage through terminal 204. TRIAC/ELV circuitry 233 may receive AC voltage from EMI circuitry 201. TRIAC/ELV circuitry 233 may alternate cutting and conducting of the current along the AC waveform to produce a dimming level. TRIAC/ELV circuitry 233 may translate the dimming level into a microcontroller readable signal. TRIAC/ELV circuitry 233 may transmit the microcontroller readable dimming signal to microcontroller 227. TRIAC/ELV circuitry 233 may transmit the dimming signal via a PWM signal to microcontroller 227. Microcontroller 227 may control the dimming level of LED modules connected to current regulated output channels 215, 217, 219, 221, 223, and 225 with corresponding PWM signals.

Figure 14:
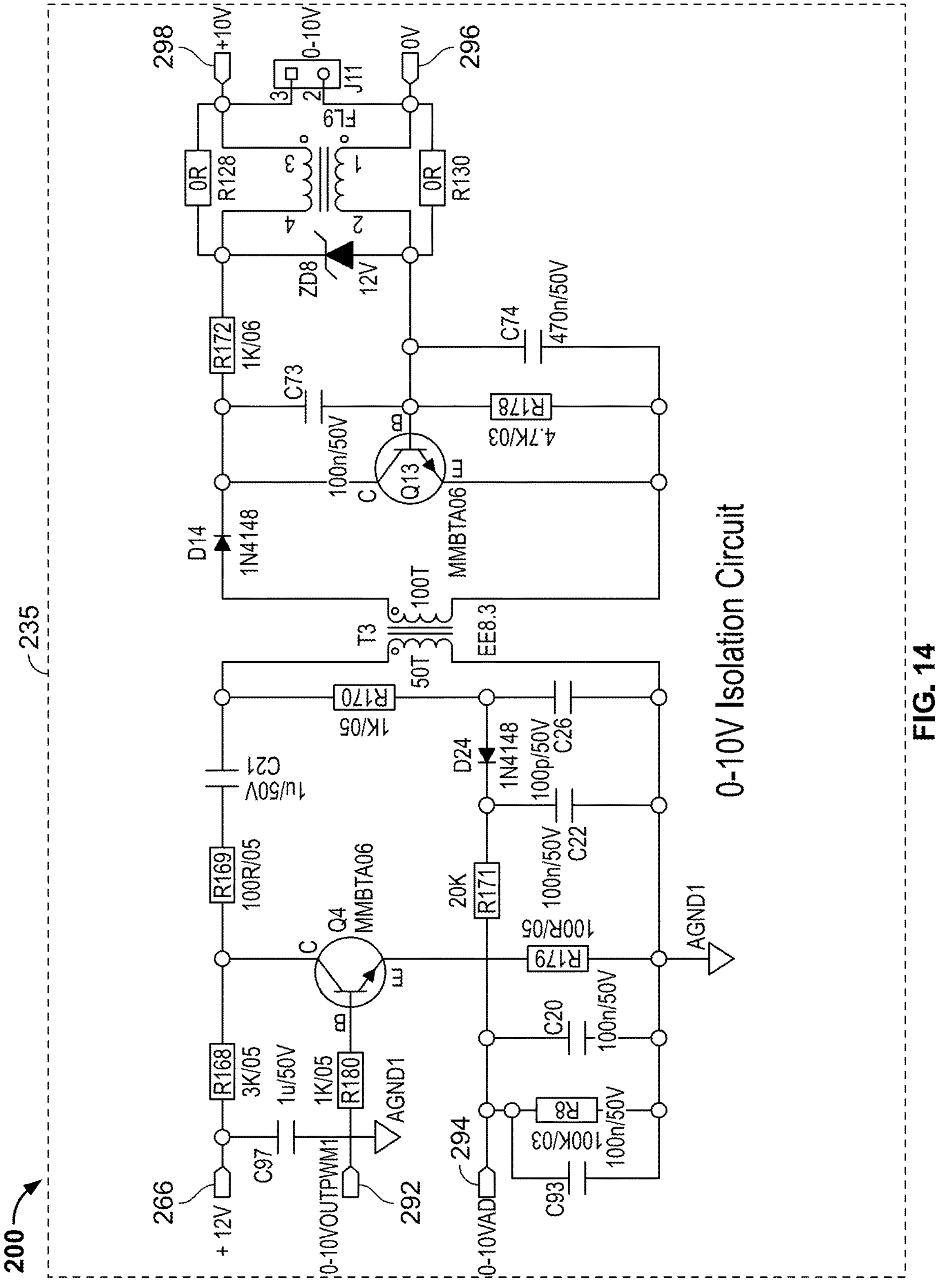
FIG. 14 shows illustrative apparatus in accordance with principles of the invention.

FIG. 14 shows illustrative circuit 200. Circuit 200 may include 0-10V circuitry 235. 0-10V circuitry 235 may receive power through terminal 266. 0-10V circuitry 235 may receive signals corresponding to a user selected 0-10V dimming level from microcontroller 227 through terminals 292 (0-10VOUTPWM1) and 294 (0-10VAD). 0-10V circuitry 235 may translate the user-selected 0-10V dimming level into output voltage levels. 0-10V circuitry 235 may output voltage levels corresponding to the user selected 0-10V dimming level. 0-10V circuitry 235 may output voltage levels corresponding to the user selected 0-10V dimming level through output channels 298 (10V) and 296 (0V). Output channels 298 and 296 may be connected to the LED modules. The voltage levels output by 0-10V circuitry 235 may control the dimming level of the connected LED modules.

Figure 15:
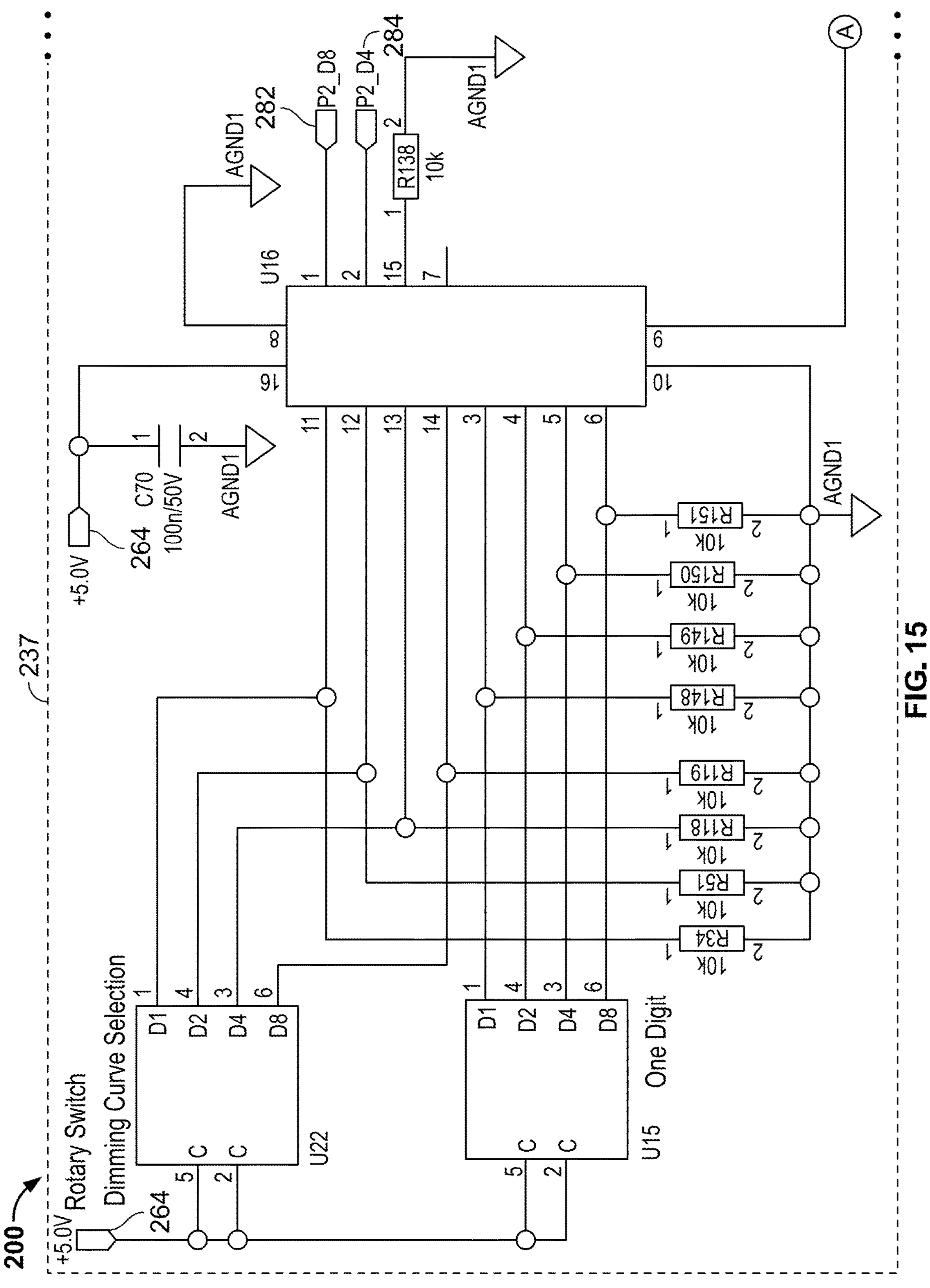
FIG. 15 shows illustrative apparatus in accordance with principles of the invention.
Figure 15:
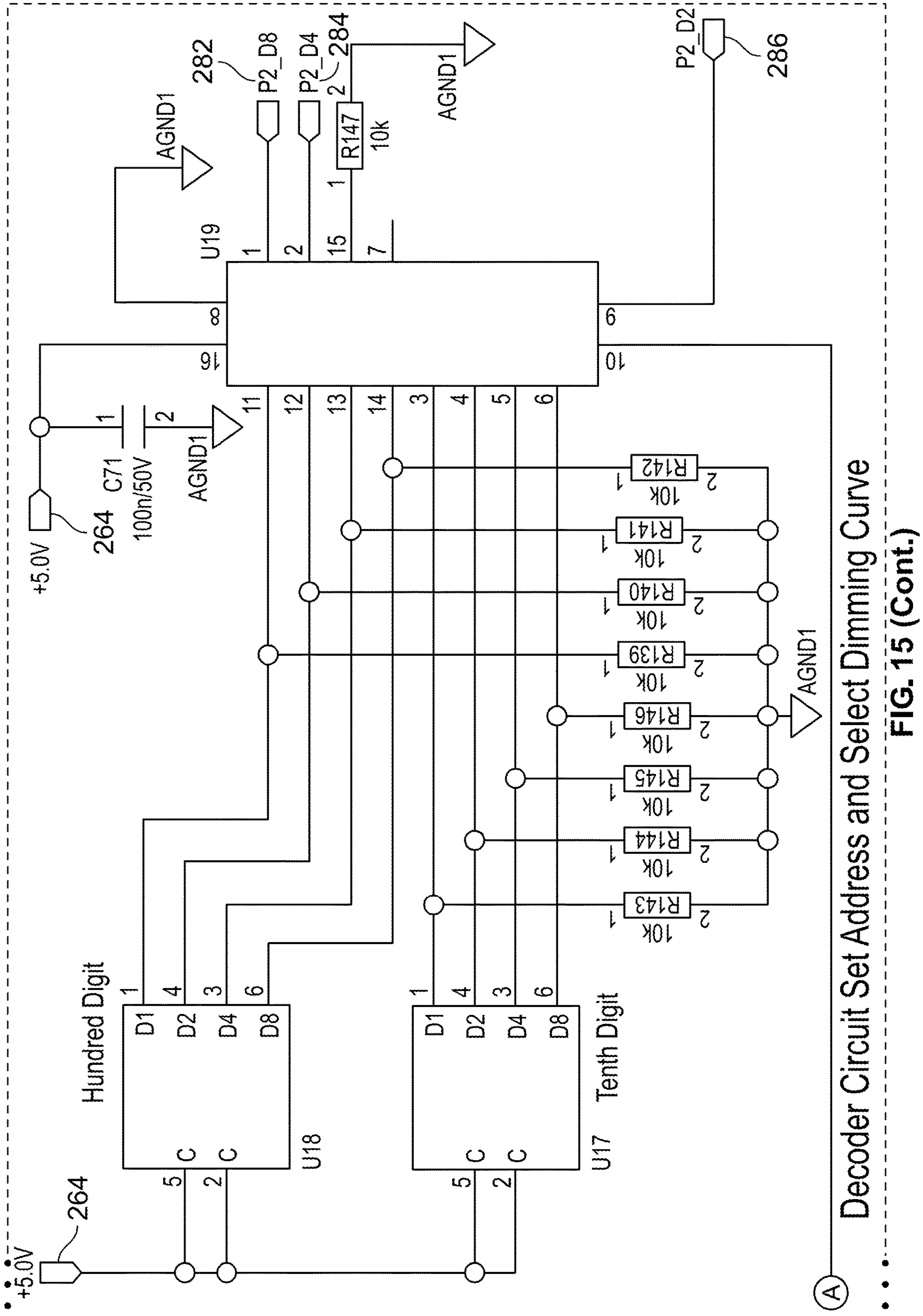

FIG. 15 shows illustrative circuit 200. Circuit 200 may include dimming curve selection circuitry 237. Dimming curve selection circuitry 237 may include a decoder circuit. Dimming curve selection circuitry 237 may be used to select a dimming curve. Dimming curve selection circuitry 237 may receive power through terminal 264. Dimming curve selection circuitry 237 may include a plurality of shift registers and rotary encoding switches. A dimming curve may be selected using the plurality of shift registers and rotary encoding switches Dimming curve selection circuitry 237 may transmit the selected dimming curve to microcontroller 227.

Dimming curve selection circuitry 237 may transmit the selected dimming curve to microcontroller 227 through terminals 282 (P2_D8), 284 (P2_D4), and 286 (P2_D2). Terminal 282 may be an enable pin. Terminal 282 may be active at a low level. Microcontroller 227 may set terminal 282 and a parallel data input from DO-D7 will be asynchronously read into the register (1 pin). Terminal 284 may be a clock input pin. Terminal 284 may control the output of terminal 286. Terminal 286 may transmit the data output to microcontroller 227.

Figure 16:
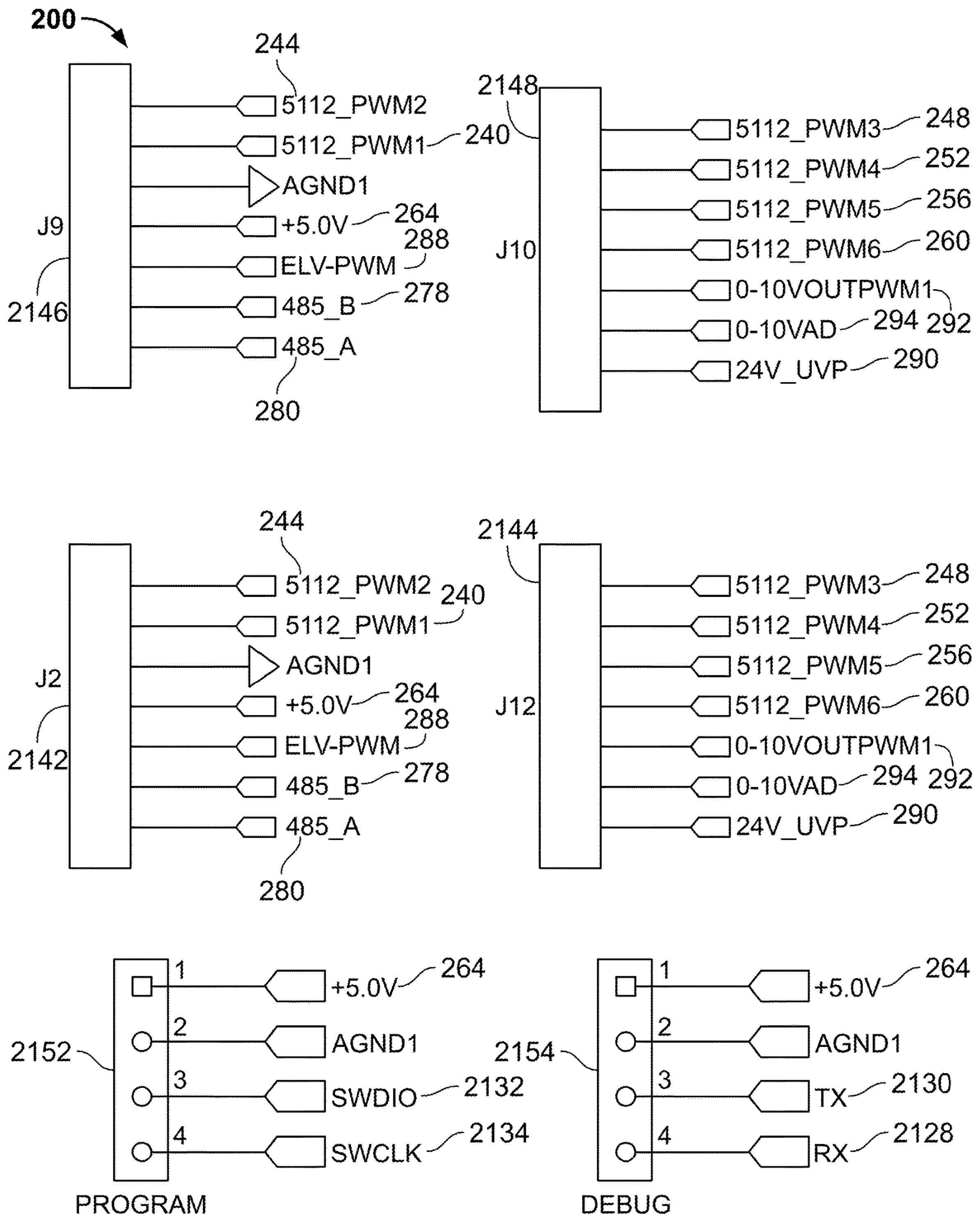
FIG. 16 shows illustrative apparatus in accordance with principles of the invention.

FIG. 16 shows illustrative circuit 200. Circuit 200 may include connectors 2146 (J9), 2148 (J10), 2142 (J2), 2144 (J12), 2152 (PROGRAM) and 2154 (DEBUG). Connectors 2146, 2148, 2142, 2144, 2152 and 2154 may be used to connect different terminals within circuit 200.

Circuit 200 may include one or more of the items, along with illustrative descriptions of the items, listed in Table 5.

TABLE 5

Illustrative items.

| Material Description | Component Tag |
|---|---|
| 1/10 W SMD resistor, 100R ± 1% (0603) | R24 |
| 1/10 W SMD Resistor 430R ± 1% (0603) | R5 |
| 1/10 W SMD Resistor, 2K ± 1% (0603) | R58, R113 |
| 1/10 W SMD Resistor, 3K ± 1% (0603) | R27 |
| 1/10 W SMD Resistor, 1.5K ± 1% (0603) | R69 |
| 1/10 W SMD Resistor, 3K ± 1% (0603) | R44 |
| 1/10 W SMD Resistor_4.7K ± 1% (0603) | R21 |
| 1/10 W SMD Resistor 5.6K ± 1% 0603 | R33 |
| 1/10 W SMD Resistor, 1K ± 1% (0603) | R35, R47 |
| 1/10 W SMD Resistor_10K ± 1% (0603) | R26, R23, R67, R59, R36 |
| 1/10 W SMD Resistor 9.1K ± 1% 0603 | R41 |
| 1/10 W SMD Resistor_12K ± 1% (0603) | R43 |
| 1/10 W SMD Resistor, 4.3K ± 1% (0603) | R56 |
| 1/10 W SMD Resistor, 6.8K ± 1% (0603) | R42 |
| 1/10 W SMD Resistor_10K ± 1% (0603) | R45, R32 |
| 1/10 W SMD Resistor_28K ± 1% (0603) | R19 |
| 1/10 W SMD Resistor, 39K ± 1% (0603) | R18 |
| 1/10 W SMD Resistor, 51K ± 5% (0603) | R17 |
| 1/10 W SMD Resistor, 75K ± 1% (0603) | R68 |
| 1/10 W SMD Resistor_30K ± 1% (0603) | R25, R39 |
| 1/10 W SMD Resistor, 200K ± 1% (0603) | R20 |
| 1/10 W SMD Resistor_270K ± 1% (0603) | R11 |
| 1/10 W SMD Resistor 820K ± 5% (0603) | R57 |
| 1/8 W SMD Resistor 75R ± 1% (0805) | R66 |
| 1/8 W SMD Resistor, 3K ± 1% (0805) | R60, |
| 1/8 W SMD Resistor 5.1K ± 1% 0805 | R206 |
| 1/8 W SMD Resistor, 47R ± 1% (0805) | R13, R28, R49 |
| 1/8 W SMD Resistor, 10K ± 1% (0805) | R16 |
| 1/8 W SMD Resistor, 47KΩ ± 1% (0805) | R29, R50 |
| 1/4 W SMD Resistor, 4.7K ± 1% (1206) | R31, R48 |
| 1/4 W SMD Resistor 0.82R ± 1% (1206) | R46, R46B, R46C, R46D, R46A |
| 1/4 W SMD Resistor, 3.6K ± 1% (1206) | R205 |
| 1/4 W SMD Resistor, 100K ± 5% (1206) | ZD2 |
| 1/4 W SMD Resistor, 510K ± 5% (1206) | R1, R2, R3, R4 |
| 1/4 W SMD Resistor 1M5 ± 1% 1206 | R14, R15, R30 |
| 1/4 W SMD Resistor_3M ± 5% (1206) | R37, R38, R40 |
| 1/4 W SMD Resistor, 5.1R ± 1% (1206) | R55, R204 |
| 1 W SMD Alloy Resistor 0.02R ± 1% (2010) | R52 |
| 3/4 W SMD Resistor 1.0K ± 5% (2010) | R64 |
| NPO SMD Capacitor 470 PF/50 V ± 5% 125° C. (0603) | C33, C86 |
| X7R SMD Capacitor 1 nF/50 V, ± 10%, 125° C. (0603) | C19, C23, C3 |
| X7R SMD Capacitor 10 nF/50 V, ± 10%, 125° C. (0603) | C25, C34 |
| X7R SMD Capacitor 33 nF/50 V ± 10%_125° C. (0603) | C16, C18 |
| X7R SMD Capacitor 100 nF/50 V, ± 10%, 125° C. (0603) | C29, C17, C78 |
| X7R SMD Capacitor 1 uF/50 V, ± 10%, 125° C. (0603) | C11, C12, C24, C8, C36, C5, C30, C31 |
| X7R SMD Capacitor 2.2 uF/25 V, ± 10%, 125° C. (0805) | C35 |
| X7R SMD Capacitor 470 nF/50 V, ± 10%, 125° C. (0603) | C14, C32 |
| X7R SMD Capacitor 100 nF/50 V, ± 10%, 125° C. (0805) | C9, C89, C87 |

TABLE 5-continued

Illustrative items.

| Material Description | Component Tag |
|---|---|
| NPO SMD Capacitor 10 PF 1K V ± 5% 125° C. 1206 | C27, C27A |
| X7R SMD Capacitor 1 uF/50 V, ± 10%, 125° C. (1206) | C90 |
| X7R SMD Capacitor 100 pF/1K V, ± 10%, 125° C. (1206) | C6, C10, C15 |
| NPO SMD Capacitor 150 pF/1K V, ± 10%, 125° C. (1206) | C28 |
| 47 pF/50 V, ± 5%, 125° C. (0805) | C75 |
| SMD switching diode, 1N4148W, 0.15 A/75 V, SOD-123 | D30 |
| SMD Voltage Regulator Diode 5.1 V/0.5 W SOD-123 | ZD6 |
| 1/8 W SMD Resistor, 1.8K ± 1% (0805) | R183 |
| SMD NPN Transistor MMBTA44 VCEO 400 V TO-236 | Q14 |
| SMD N-MOSFET, UTC 4N65KG-TN3-R, TO-252 | Q15 |
| 1/4 W SMD Resistor, 220K ± 5% (1206) | R182, R184, R199, R200 |
| 1/4 W SMD Resistor, 10R ± 1% (1206) | R185, R186 |
| SMD Schottky diode 0.35 A/40 V, SD103AW, SOD-123 | D7 |
| SMD Rectifier Diode, 1 A/1000 V, SOD-123 | D3, D5, D8, D26, D25 |
| Ultra-fast recovery diode ES1J W 1 A/600 V SOD-123FL | D4 |
| SMD switching diode, 1N4148 W, 0.15 A/75 V, SOD-123 | D20, D19, D13, D12, D28, D1, D17, D16 |
| SMD switching diode, SOD1F6, 1 A/600 V, SOD-123FL | D9 |
| SMD Voltage Regulator Diode, 13 V, 0.5 W, SOD-123 | ZD1, ZD7 |
| SMD NPN Transistor 2SD1760U_SOT-89_60 V/3 A | Q18, Q5 |
| Ne W SMD NMOS 13 A 700 V CRJD360N70G2 TO-252 | Q1 |
| SMD NMOS 8NM65L-TN3-R 8 A 650 V R = 0.6 TO-252 | Q2, Q3 |
| SMD IC BP8519C SOT23-5 Tray Packaging RoHS | U1 |
| SMD optocoupler BL817S-C, 4-pin, Galaxy | U2 |
| SMD Power IC, ON, NCP1654BD65R2G SO-8, Reel Packaging, ROHS | U3 |
| SMD Power IC, MPS HR1001BGS SOIC-16 Reel Packaging, ROHS | U7 |
| SMD Voltage Regulator IC TL431(SOT-23) ± 1% | U4, U26 |
| SMD IC, BL78L05, SOT-89 | U6 |
| SMD Operational Amplifier IC LM258(SO-8) | U5 |
| Double-sided PCB FR4 250 * 90 * 1.6 MM 1 * 2 contiguous 1 OZ ROHS | |
| 1/10 W SMD Resistor, 20K ± 5% (0603) | R175 |
| 1/10 W SMD Resistor, 3K ± 1% (0603) | R177 |
| 1/4 W SMD Resistor, 1R ± 1 % (1206) | R173, R174 |
| X7R SMD Capacitor 100 nF/50 V, ± 10%, 125° C. (0805) | C81, C83, C84 |
| SMD Schottky diode, DSK26, 2 A/60 V, SOD-123FL | D27 |
| SMD IC MC34063A SOP-8 VCC −0.3 −+ 40 V RoHS | U24 |
| SMD Inductor 22 uH ± 10% 5.8 * 5.2 * 2.1 mm | L13 |
| 1/8 W SMD Resistor, 4.7K ± 1% (0805) | R81, R83 |
| 1/10 W SMD Resistor, 2K ± 1% (0603) | R84 |
| X7R SMD Capacitor 100 nF/50 V, ± 10%, 125° C. (0603) | C101 |
| NPO SMD Capacitor 330 pF/1000 V, ± 5%, 125° C. (1206) | C98 |
| SMD Voltage Regulator Diode, 10 V/0.5 W, BZT52B10SOD-123 | ZD8, ZD9, ZD10, ZD11 |
| Ultra-fast recovery diode ES1JW 1 A/600 V SOD-123FL | D29 |
| X7R SMD Capacitor 10 nF/100 V ± 10% 125° C. (0805) | C99 |
| 1/8 W SMD Resistor, 10K ± 1% (0805) | R6 |
| 1/4 W SMD Resistor, 10K ± 5% (1206) | R7 |
| MOSFET 2N7002 60 V/250 mA SOT-23 | Q6 |
| SMD N-MOSFET_3 A/60 V_UT3N06G-AB3-R_SOT-89 | Q7 |
| SMD IC Huihai H5112A SOP8 RoHS | U8, U9, U10, U11, U12, U13 |
| SMD Schottky diode 5 A/60 V, SS56, SMA | D2, D6, D18, D21, D22, D23 |
| SMD Ferrite Bead, 160Ω, 6 A, 1206 | LF1, LF2, LF3, LF4, LF5, LF6 |
| X7R SMD Capacitor 1 nF/500 V ± 10% 125° C. (1206) | C39, C44, C49, C54, C59, C64 |
| X7R SMD Capacitor 10 nF/250 V, ± 10%, 125° C. (1206) | R62, R78, R89, R100, R111, R125 |
| 1/4 W SMD Resistor, 3K ± 1% (1206) | R65, R85, R96, R107, R121, R132 |
| X7R SMD Capacitor 2.2 uF/25 V, ± 10%, 125° C. (0805) | C38, C43, C48, C53, C58, C63 |
| X7R SMD Capacitor 1 uF/50 V, ± 10%, 125° C. (1206) | C41, C46, C51, C56, C61, C66 |
| 1/10 W SMD Resistor_10K ± 1% (0603) | R63, R79, R90, R101, R112, R126 |
| 1/10 W SMD Resistor, 5.1K ± 1% (0603) | C37, C42, C47, C52, C57, C62 |
| 1/4 W SMD Resistor, 1R ± 1% (1206) | R73, R53, R82, R70, R87, R88, R98, R99, R109, R110, R123, R124 |
| 1/4 W SMD Resistor, 2.2R ± 1% (1206) | R129, R116, R104, R93, R77, R54, R61, R76, R86, R97, R108, R122 |
| SMD Inductor 100 uH ± 20% 1.4 A 8 * 8 * 6.5 mm | L5, L6, L8, L9, L10, L11 |
| SMD transistor MMBTA06, 1 GM (SOT-23) | Q16 |
| 1/4 W SMD Resistor, 220K ± 5% (1206) | R187, R188 |
| 1/8 W SMD Resistor, 22K ± 1% (0805) | R189 |
| 1/8 W SMD Resistor, 1K ± 1% (0805) | R190 |
| 1/8 W SMD Resistor, 2.2K ± 1% (0805) | R191 |
| SMD optocoupler BL817S-C, 4-pin, Galaxy | U20 |
| 1/8 W SMD Resistor, 0R ± 5% (0805) | R202, R203, R201 |
| SMD Voltage Regulator Diode 5.1 V/0.5 W SOD-123 | ZD5 |
| 1/8 W SMD Resistor, 1.5K ± 1% (0805) | R181 |
| 1/8 W SMD Resistor, 10K ± 1% (0805) | R192 |
| 1/8 W SMD Resistor, 1K ± 1% (0805) | R193 |
| MOSFET 2N7002 60 V/250 mA SOT-23 | Q17 |

TABLE 5-continued

Illustrative items.

| Material Description | Component Tag |
|---|---|
| X7R SMD Capacitor 1 uF/50 V, ± 10%, 125° C. (0603) | C97 |
| 1/4 W SMD Resistor, 3K ± 1% (1206) | R168 |
| 1/8 W SMD Resistor, 100Ω ± 1% (0805) | R169, R179 |
| 1/8 W SMD Resistor, 1K ± 1% (0805) | R180, R170 |
| SMD transistor MMBTA06, 1 GM (SOT-23) | Q4, Q13 |
| X7R SMD Capacitor 1 uF/50 V, ± 10%, 125° C. (0805) | C21 |
| SMD switching diode, 1N4148 W, 0.15 A/75 V, SOD-123 | D24, D14 |
| 1/10 W SMD Resistor, 20K ± 5 % (0603) | R171 |
| NPO SMD Capacitor 100 pF/50 V_± 5%_125° C. (0603) | C26 |
| X7R SMD Capacitor 100 nF/50 V, ± 10%, 125° C. (0603) | C22, C20 |
| 1/10 W SMD Resistor, 100K ± 5% (0603) | R8 |
| X7R SMD Capacitor 100 nF/50 V, ± 10%, 125° C. (0805) | C73 |
| 1/4 W SMD Resistor, 1K ± 5% (1206) | R172 |
| SMD Voltage Regulator Diode 12 V ± 2%/MM1ZB12 0.5 W SOD-123 | ZD3 |
| 1/8 W SMD Resistor, 4.7K ± 1% (0805) | R178 |
| X7R SMD Capacitor 470 nF/50 V, ± 10%, 125° C. (0805) | C74 |
| X7R SMD Capacitor 1 uF/50 V, ± 10%, 125° C. (0805) | C95 |
| X7R SMD Capacitor 100 nF/50 V, ± 10%, 125° C. (0805) | C96, C70, C71 |
| SMD IC MCU Mesilicon ME32F031C8T6 LQFP48 | U14 |
| SMD IC, 74HC165, SOIC-16 | U16, U19 |
| 1/10 W SMD Resistor_10K ± 1% (0603) | R138, R150, R148, R151, R149, R34, R118, R51, R119, R166, R139, R140, R141, R142, R147, R143, R144, R145, R146 |
| X7R SMD Capacitor 100 nF/50 V, ± 10%, 125° C. (0603) | C94, C79, C68, C69, C80, C92, C93, C67 |
| 1/10 W SMD Resistor_10K ± 1% (0603) | R133 |
| 1/8 W SMD Resistor 5.1K ± 1% 0805 | R167 |
| Chip IC MAX14781EESA + SO-8 | U31 |
| Chip resettable fuse 0.05 A/60 V (1206) | R165, R164 |
| 1/4 W SMD Resistor, 5.1R ± 1% (1206) | R162, R163 |
| SMD bidirectional TVS tube 7 V/12 V (SOT-23)SM712 | ZD4 |
| 1/8 W SMD Resistor, 47KΩ ± 1% (0805) | R153, R161 |
| 1/10 W SMD Resistor, 1K ± 1% (0603) | R156, R160, R159 |
| 1/10 W SMD Resistor, 22R ± 5% (0603) | R157, R158, R154 |
| X7R SMD Capacitor 100 nF/50 V, ± 10%, 125° C. (0805) | C72 |
| 1/10 W SMD Resistor_10K ± 1% (0603) | R155 |
| SMD NMOS LBSS138LT1G 0.2 A/50 V SOT-23 | Q12 |
| 1/8 W SMD Resistor 5.1K ± 1% 0805 | R71 |
| Slow-blow Square Fuse 3.15 A300 V 8.5 * 8 * 4.5 12.7 Hole Spacing Tape Packaged | F1 |
| Thermistor NTC 5D-9 5R ± 0% Inner Bent Leads | RT1 |
| Varistor Φ10 mm 510 V ± 10% 7.5 P Tape Packaged High Surge | R V1 |
| Varistor Φ7 mm 510 V ± 10% 7.5 P Tape Packaged | R V2 |
| Varistor Φ7 mm 560 V ± 10% 7 P Tape Packaged | R V3 |
| X2 Safety Capacitor 0.1 uF/305 V ± 10% P = 10 T = 5 | CX1, C2 |
| X2 Safety Capacitor 0.1 uF/305 V ± 10% P = 10 T = 5 | CX2 |
| X2 Safety Capacitor 0.22 uF/310 V ± 10% P = 10 L = 3.0 | C1 |
| Iron-Silicon-Aluminum Inductor 250 UH MIN Magnetic Core KS050-125A Vertical | L1, L3 |
| Common-Mode Inductor UU10.5 (70:70) 22 mH MIN | FL4 |
| Common mode inductor T13X8X6.5 1.9 mH | FL2 |
| Common mode inductor T13 * 7 * 5 18 uH ± 20% | FL10 |
| Y1 safety capacitor 2.2 nF/400 V ± 20% P = 10 | CY7 |
| Plug-in Bridge Rectifier 4 A 1000 V GBP410 GBP | BD1 |
| Iron-Silicon-Aluminum Inductor 430 UH MIN Magnetic Core KS065-125 Vertical | L7 |
| Y2 safety capacitor 1 NF 300 V ± 20% Y5P P = 7.5 pin length L = 3.5 MM | CY2, CY4 |
| Electrolytic capacitor 1 uF/500 V ± 20% 105° C. Φ6.3 * 11 | EC1 |
| Plug-in color ring inductor CKL0510 2.8 mH J-CCA | L2 |
| Ultrafast Diode 10 A/600 V SF1008F ITO-220AC | D15 |
| Electrolytic capacitor 22 uF ± 20% 50 V 105° C. Φ5 * 11 mm 7000 H | EC2, EC3, EC4, C82, C85 |
| Electrolytic Capacitor FT 33 UF/500 V ± 20% 105° C. 6000HΦ16 * 25 | C4 |
| MMKP82 bimetallic polypropylene capacitor 18 NF/1000 V ± 5% P = 10 L = 3.5 | C7 |
| Electrolytic Capacitor 1500 uF 35 V ± 20% 105° C. Φ13 * 20 6K Hole Spacing Tape Packaged | EC5 |
| Electrolytic Capacitor RJ 680 UF/35 V ± 20% 105° C. Φ10 * 16 Pin Length 3.0 MM | EC6 |
| Schottky Diode 20 A/100 V PS20U100FCT ITO-220AB | D10, D11 |

TABLE 5-continued

Illustrative items.

| Material Description | Component Tag |
|---|---|
| PFC transformer PQ2620 0.1 * 30 * 65.5 L = 550 UH pin length 3.0 MM | L4 |
| Main transformer ER28 horizontal double slot 54:6:6 L = 1.1 MH pin length 3.0 MM | T2 |
| Electrolytic Capacitor 100 uF/35 V ± 20% 105° C. Φ6.3 * 11 12.7 Hole Spacing Tape Packaged | C40, C45, C50, C55, C60, C65 |
| 18# White Teflon Wire, Length 220, Partially Stripped 13/Tin-dipped 3 | N |
| 18# Black Teflon Wire, Length 220, Partially Stripped 13/Tin-dipped 3 | L |
| Ferrite Bead, RH3.5 * 3 * 1.5 Nickel-Zinc | D10, D11, D15 pins |
| Zhengdasheng Instant Adhesive 221F | Fixed Ferrite Bead |
| PH2.54 2xH2.54X7PIN L = 22 mm single-row pin header | J9, J10(Connecting A/B panel) |
| 2 W small-volume plug-in wire-wound resistor 100R ± 5% tape packaged | R72 |
| Red, black, and white button terminal block, 2 sets DA805-550-2P UL certified | J1, J3, J4, J5, J6, J7 |
| Transformer EE8.3 100: 50 26 mH ± 30% | T3 |
| Common-Mode Inductor 9 * 5 * 3 200 uH | FL1, FL3, FL5, FL6, FL7, FL8, FL9 |
| Purple, Pink, and white button terminal block, 2 sets DA805-550-2P UL certified | J11 |
| Single-sided PCB CEM-1 164 * 24 * 1.6 mm 2 * 5 Panel, RoHS | D10, D11 side |
| 10-position rotary encoding switch | U22, U15, U17, U18 |
| 2-speed toggle switch vertical plug P = 2.5 mm | S1 |
| Dual network port female terminal RJ45 | T1 |
| 6-way output MCU firmware 0-10 V version ME32F031C8T6 REV.A | |
| DMX top cover baked enamel BK | |
| PS-0600A-UR6-X Plug Assembly | |
| Insulation sheet B | |
| Insulation sheet B | |
| Main body welding component, baked enamel finish BK | |
| PS-0600A-UR6-X DMX Version silk screen | |
| φ5.2 round head Phillips screw M3 * 0.5 tooth length 5 dyed black | |
| φ6.6 Round Head Phillips Screws 5/32 | |
| Xishun Two-Component Sealing Adhesive, Barrel Packaging, 280 KG | |
| Single-Component White Sealing Silicone, XS1110C | |
| 3011 Protective Wire Slee Ve, Black | |
| Terminal Cover Plate, Baked Enamel Finish BK | |
| Gray Thermal Conductive Silicone Pad, 164 × 5 × 5 | |
| 18# Green Teflon-Coated Lead Wire, Length 220, Tin-Dipped 13/3.2 Ring Terminal | |
| 120-277 V dimming power supply 6-Way output 2-21 V 600MA DMX Version | |
| WAC inner box B9B according to the parameters 130 * 80 * 350 mm | |
| Pearl Wool 16 kg 125 * 75 * 50 mm | |
| WAC Outer Box A = B 365 * 275 * 280 mm | |
| Plastic bag 400 * 150 mm T = 0.025 mm opening on the short side punched according to the standard | |

All ranges and parameters disclosed herein shall be understood to encompass any and all subranges subsumed therein, every number between the endpoints, and the endpoints. For example, a stated range of "1 to 10" should be considered to include any and all subranges between (and inclusive of) the minimum value of 1 and the maximum value of 10; that is, all subranges beginning with a minimum value of 1 or more (e.g. 1 to 6.1), and ending with a maximum value of 10 or less (e.g., 2.3 to 10.4, 3 to 8, 4 to 7), and finally to each number 1, 2, 3, 4, 5, 6, 7, 8, 10, and 10 contained within the range.

Thus, apparatus and methods providing power to LED lights have been provided. Persons skilled in the art will appreciate that the present invention can be practiced by other than the described examples, which are presented for purposes of illustration rather than of limitation.

What is claimed is:

1. Apparatus for providing power to light-emitting diode ("LED") light sources, the apparatus comprising:

a plurality of power output channels, each configured to provide power to one of a plurality of LED modules, each LED module corresponding to one of the power output channels;

a protection circuit that is configured to:

receive a conditioned voltage; and use the conditioned voltage to produce output current that has a power no greater than a predetermined power limit; and a voltage conditioning circuit that is configured to:

receive line voltage; and provide the conditioned voltage to the protection circuit;

wherein the output current is distributed to the power output channels after the protection circuit produces the output current.

2. The apparatus of claim 1 wherein the predetermined power limit is:
factory-set; and
not user-selectable.

3. The apparatus of claim 2 wherein the predetermined power limit is nominally 96 W.

4. The apparatus of claim 1 wherein the plurality of LED modules has a number of operational LED modules that is:
user-selectable; and
limited by the predetermined power limit.

5. The apparatus of claim 1 wherein the protection circuit is configured to prevent user exposure, from the LED modules in aggregate, to power greater than the predetermined power limit, independent of a number of LED modules connected to the power output channels.

6. The apparatus of claim 1 further comprising, when each of the LED modules has brightness, a microcontroller that:
includes a dimming mode setting; and
is configured to adjust the brightness of each of the modules based on a dimming signal corresponding to the dimming mode setting.

7. The apparatus of claim 6 wherein the microcontroller is further configured to adjust individually the brightnesses.

8. The apparatus of claim 7 wherein:
the plurality of LED modules includes:
a first LED module; and
a second LED module; and
the first LED module and the second LED module receive power from the same power output channel.

9. The apparatus of claim 8 wherein the first LED module and the second LED module are connected in series with each other.

10. The apparatus of claim 6 wherein the dimming signal is an electrical low voltage ("ELV") dimming signal.

11. The apparatus of claim 6 wherein the dimming signal is a triode for alternating current ("TRIAC") dimming signal.

12. The apparatus of claim 6 wherein the dimming signal is a 0-10 volt dimming signal.

13. The apparatus of claim 6 wherein the dimming signal is a digital multiplexing signal.

14. The apparatus of claim 6 wherein:
the LED modules have an operating voltage; and
the voltage conditioning circuit is configured to:
generate from the line voltage a boosted voltage that is greater than the line voltage; and,
using the boosted voltage provide, via the protection circuit, to the power output channels a reduced voltage that is greater than the operating voltage.

15. The apparatus of claim 14 wherein the power output channels are configured to provide regulated current to the LED modules at the operating voltage.

16. The apparatus of claim 15 wherein:
the power output channels;
the protection circuit; and
the voltage conditioning circuit are included in a power-limited power supply that includes a microcontroller; and
the regulated current is based on a control signal received from the microcontroller.

17. The apparatus of claim 1 further comprising, when each of the LED modules has brightness, a microcontroller that:
includes:
a dimming mode setting; and
a dimming curve setting;
is configured to adjust:
the brightness of each of the modules based on a dimming signal corresponding to the dimming mode setting; and
a correlated color temperature ("CCT") of each of the modules based on:
the dimming curve; and
the brightness.

18. The apparatus of claim 17 wherein the microcontroller is further configured to adjust individually the brightnesses.

19. The apparatus of claim 18 wherein:
the plurality of LED modules includes:
a first LED module; and
a second LED module; and
the first LED module and the second LED module receive power from the same power output channel.

20. The apparatus of claim 19 wherein the first LED module and the second LED module are connected in series with each other.

21. The apparatus of claim 17 wherein the dimming signal is an electrical low voltage ("ELV") dimming signal.

22. The apparatus of claim 17 wherein the dimming signal is a TRIAC dimming signal.

23. The apparatus of claim 17 wherein the dimming signal is a 0-10 volt dimming signal.

24. The apparatus of claim 17 wherein the dimming signal is a digital multiplexing signal.

25. The apparatus of claim 17 wherein:
the LED modules have an operating voltage; and
the voltage conditioning circuit is configured to:
generate from the line voltage a boosted voltage that is greater than the line voltage; and,
using the boosted voltage provide, via the protection circuit, to the power output channels a reduced voltage that is greater than the operating voltage.

26. The apparatus of claim 25 wherein the power output channels are configured to provide regulated current to the LED modules at the operating voltage.

27. The apparatus of claim 26 wherein:
the power output channels;
the protection circuit; and
the voltage conditioning circuit are included in a power-limited power supply that includes a microcontroller; and
the regulated current is based on a control signal received from the microcontroller.

28. Apparatus for providing power to light-emitting diode ("LED") light sources, the apparatus comprising:
a plurality of LED modules;
a plurality of power output channels, each configured to provide power to a corresponding one of the LED modules;
a protection circuit that is configured to:
receive a conditioned voltage; and
use the conditioned voltage to produce output current that has a power no greater than a predetermined power limit; and
a voltage conditioning circuit that is configured to:
receive line voltage; and
provide the conditioned voltage to the protection circuit;
wherein the output current is distributed to the power output channels after the protection circuit produces the output current.

29. Apparatus for providing power to light-emitting diode ("LED") light sources, the apparatus comprising:

a plurality of LED light sources;

a plurality of LED modules, each of the light sources corresponding to one of the LED modules;

a plurality of power output channels, each configured to provide power to a corresponding one of the LED modules;

a protection circuit that is configured to:

receive a conditioned voltage; and use the conditioned voltage to produce output current that has a power no greater than a predetermined power limit; and a voltage conditioning circuit that is configured to:

receive line voltage; and provide the conditioned voltage to the protection circuit;

wherein the output current is distributed to the power output channels after the protection circuit produces the output current.

30. The apparatus of claim 29 wherein when each of the LED modules has brightness, a microcontroller that:

includes a dimming mode setting; and is configured to adjust the brightness of each of the modules based on a dimming signal corresponding to the dimming mode setting.

* * * * *